United States Patent
Lee et al.

(10) Patent No.: US 10,880,552 B2
(45) Date of Patent: Dec. 29, 2020

(54) METHOD AND APPARATUS FOR PERFORMING OPTIMAL PREDICTION BASED ON WEIGHT INDEX

(71) Applicant: LG ELECTRONICS INC., Seoul (KR)

(72) Inventors: Jaeho Lee, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/336,397

(22) PCT Filed: Sep. 28, 2017

(86) PCT No.: PCT/KR2017/010810
§ 371 (c)(1),
(2) Date: Mar. 25, 2019

(87) PCT Pub. No.: WO2018/062892
PCT Pub. Date: Apr. 5, 2018

(65) Prior Publication Data
US 2019/0230364 A1 Jul. 25, 2019

Related U.S. Application Data

(60) Provisional application No. 62/401,152, filed on Sep. 28, 2016.

(51) Int. Cl.
*H04N 19/159* (2014.01)
*H04N 19/119* (2014.01)
(Continued)

(52) U.S. Cl.
CPC ......... *H04N 19/159* (2014.11); *H04N 19/105* (2014.11); *H04N 19/119* (2014.11);
(Continued)

(58) Field of Classification Search
USPC .................................................. 375/240.12
See application file for complete search history.

(56) References Cited

U.S. PATENT DOCUMENTS

| 2007/0206117 A1* | 9/2007 | Tian ........................ H04N 7/012 348/452 |
| 2014/0072041 A1* | 3/2014 | Seregin .................. H04N 19/46 375/240.13 |

(Continued)

FOREIGN PATENT DOCUMENTS

| KR | 10/2008-0006494 A | 1/2008 |
| KR | 10-2008-0064981 A | 7/2008 |

(Continued)

*Primary Examiner* — Behrooz M Senfi
(74) *Attorney, Agent, or Firm* — Dentons US LLP

(57) ABSTRACT

The present invention provides a method for performing bidirectional prediction on a current block by using a weight index, the method comprising the steps of: determining whether the number of pixels of the current block is less than or equal to a threshold number of pixels; determining a weight index or a weight value of the current block on the basis of a weight index of a neighboring block if the number of pixels of the current block is less than or equal to the threshold number of pixels; obtaining a bidirectional predicted value for the current block on the basis of the weight index or the weight value of the current block; and restoring the current block by using the bidirectional predicted value, wherein the threshold number of pixels indicates a maximum number of pixels within a block necessary to share a weight index between blocks.

10 Claims, 20 Drawing Sheets

(51) Int. Cl.
  *H04N 19/70*   (2014.01)
  *H04N 19/176*  (2014.01)
  *H04N 19/96*   (2014.01)
  *H04N 19/136*  (2014.01)
  *H04N 19/577*  (2014.01)
  *H04N 19/105*  (2014.01)

(52) U.S. Cl.
  CPC ......... *H04N 19/136* (2014.11); *H04N 19/176* (2014.11); *H04N 19/577* (2014.11); *H04N 19/70* (2014.11); *H04N 19/96* (2014.11)

(56) References Cited

U.S. PATENT DOCUMENTS

| | | | |
|---|---|---|---|
| 2014/0294078 A1* | 10/2014 | Seregin | H04N 19/00 |
| | | | 375/240.15 |
| 2018/0295385 A1* | 10/2018 | Alshin | H04N 19/577 |
| 2019/0230350 A1* | 7/2019 | Chen | H04N 19/573 |
| 2019/0297325 A1* | 9/2019 | Lim | H04N 19/513 |

FOREIGN PATENT DOCUMENTS

| | | |
|---|---|---|
| KR | 10-2013-0084314 A | 7/2013 |
| KR | 10-2014-0096130 A | 8/2014 |
| KR | 10-2015-0139881 A | 12/2015 |

\* cited by examiner

FIG. 3
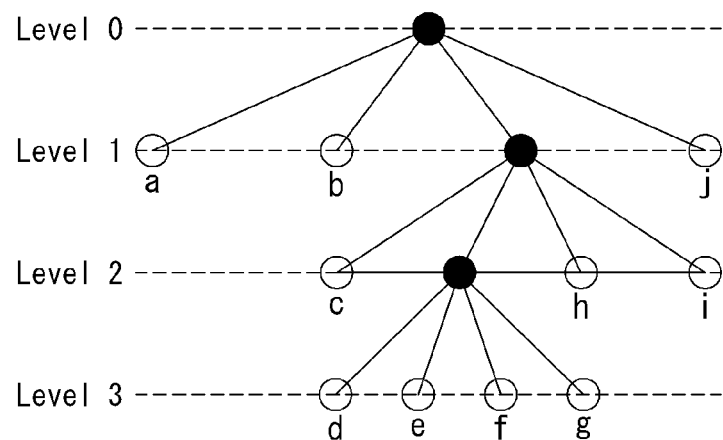
(a)
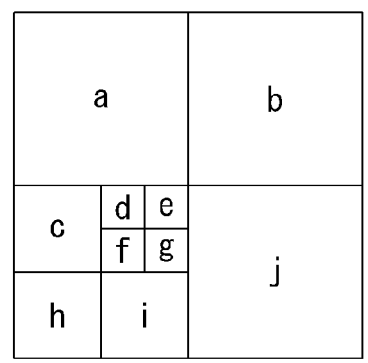
(b)

FIG. 4
Intra:
2Nx2N
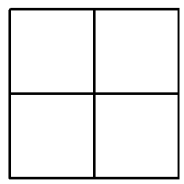
NxN
Inter:
2Nx2N
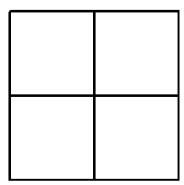
NxN
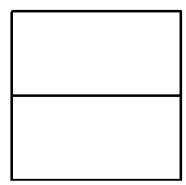
2NxN
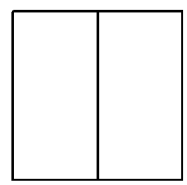
Nx2N
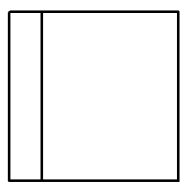
nLx2N
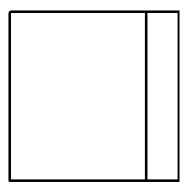
nRx2N
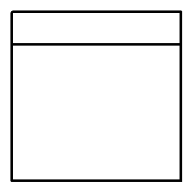
2NxnU
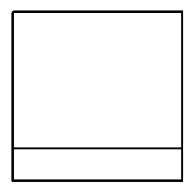
2NxnD (a) Luma  (b) Chroma

FIG. 11

| prediction_unit( x0, y0, nPbW, nPbH ) { | Descriptor |
|---|---|
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B ) { | |
|         inter_pred_idc[ x0 ][ y0 ] | ae(v) |
|         if( inter_pred_idc[ x0 ][ y0 ] == PRED_BI ) { | |
|           gbi_idx[ x0 ][ y0 ] | ae(v) |
|         } | |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && | |
|           inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

S1110 — if( inter_pred_idc[ x0 ][ y0 ] == PRED_BI ) {
S1120 — gbi_idx[ x0 ][ y0 ]

| slice_segment_header ( ) { | Descriptor |
|---|---|
| ... | |
|   if( !dependent_slice_segment_flag ) { | |
|     ... | |
|     slice_type | ue(v) |
|     ... | |
|     if( slice_type = = P \|\| slice_type = = B ) { | |
|       ... | |
|       if( slice_type = = B ) | |
|       pix_num_threshold | ue(v) |
|     } | |
|     ... | |
|   } | |
|   ... | |
| } | |

S1410 → if( slice_type = = B )
S1420 → pix_num_threshold

FIG. 15

| prediction_unit( x0, y0, nPbW, nPbH ) { | Descriptor |
|---|---|
|   if( cu_skip_flag[ x0 ][ y0 ] ) { // SKIP | |
|   ... | |
|   } else { // MERGE | |
|   ... | |
|     } else { // INTER | |
|       if( slice_type = = B ) { | |
|         inter_pred_idc [ x0 ][ y0 ] | ae(v) |
|         if( inter_pred_idc[ x0 ][ y0 ] = = PRED_BI ) { | |
|           if (cur_pix_num =< pix_num_threshold) { | ae(v) |
|             if (neighbourBlockHasGBiIdx()) | |
|               set curret GBi idx from neighbour GBi idx | |
|             else | |
|               gbi_idx[ x0 ][ y0 ] | ae(v) |
|           } | |
|         } | |
|         if( inter_pred_idc[ x0 ][ y0 ] != PRED_L1 ) { | |
|           if( num_ref_idx_l0_active_minus1 > 0 ) | |
|             ref_idx_l0[ x0 ][ y0 ] | ae(v) |
|           mvd_coding( x0, y0, 0 ) | |
|           mvp_l0_flag[ x0 ][ y0 ] | ae(v) |
|         } | |
|         ... | |
|       } | |
|     } | |
|   } | |

S1510 — if( inter_pred_idc[ x0 ][ y0 ] = = PRED_BI ) {
S1520 — if (cur_pix_num =< pix_num_threshold) {
S1530 — if (neighbourBlockHasGBiIdx())
S1540 — set curret GBi idx from neighbour GBi idx
S1550 — gbi_idx[ x0 ][ y0 ]

| slice_segment_header ( ) { | Descriptor |
|---|---|
| ... | |
|   if( !dependent_slice_segment_flag ) { | |
| ... | |
|     slice_type | ue(v) |
| ... | |
|     if( slice_type == P \|\| slice_type == B ){ | |
|      ... | |
| S1810 —       if( slice_type == B ) | |
| S1820 —         QT_size_threshold | ue(v) |
|     } | |
| ... | |
|   } | |
| ... | |
| } | |

FIG. 19

| prediction_unit( x0, y0, nPbW, nPbH ) { | Descriptor |
|---|---|
| if( cu_skip_flag[ x0 ][ y0 ] ) { // SKIP | |
| ... | |
| } else { // MERGE | |
| ... | |
| } else { // INTER | |
| if( slice_type == B ) { | |
| inter_pred_idc[ x0 ][ y0 ] | ae(v) |
| S1910 — if( inter_pred_idc[ x0 ][ y0 ] == PRED_BI ) { | |
| S1920 — if (cur_blk_QT_size =< QT_threshold && BT_split_flag == true )// BT split인 경우 | ae(v) |
| S1930 — if ( isFirstBtBlkOfThisQtBlk) // 첫번째 BT 블록인 경우 | |
| S1940 — gbi_idx[ x0 ][ y0 ] | ae(v) |
| else | |
| S1950 — set curret GBi idx from 1st BT block in the current QT | |
| else | |
| S1960 — gbi_idx[ x0 ][ y0 ] | |
| } | |
| } | |
| if( inter_pred_idc[ x0 ][ y0 ] != PRED_L1) { | |
| if( num_ref_idx_l0_active_minus1 > 0 ) | |
| ref_idx_l0[ x0 ][ y0 ] | ae(v) |
| mvd_coding( x0, y0, 0 ) | |
| mvp_l0_flag[ x0 ][ y0 ] | ae(v) |
| } | |
| ... | |
| } | |
| } | |
| } | |

FIG. 21

| prediction_unit( x0, y0, nPbW, nPbH ) { | Descriptor |
|---|---|
| if( cu_skip_flag[ x0 ][ y0 ] ) { // SKIP | |
| ... | |
| } else { // MERGE | |
| ... | |
| } else { // INTER | |
| if( slice_type = = B ) { | |
| inter_pred_idc[ x0 ][ y0 ] | ae(v) |
| if( inter_pred_idc[ x0 ][ y0 ] = = PRED_BI ) { | |
| if (cur_pix_num =< pix_num_threshold) { | ae(v) |
| set curret GBi idx as pre-defined GBi idx | ae(v) |
| } | |
| } | |
| if( inter_pred_idc[ x0 ][ y0 ] != PRED_L1 ) { | |
| if( num_ref_idx_l0_active_minus1 > 0 ) | |
| ref_idx_l0[ x0 ][ y0 ] | ae(v) |
| mvd_coding( x0, y0, 0 ) | |
| mvp_l0_flag[ x0 ][ y0 ] | ae(v) |
| } | |
| ... | |
| } | |
| } | |
| } | |

S2110 — if( inter_pred_idc[ x0 ][ y0 ] = = PRED_BI ) {
S2120 — if (cur_pix_num =< pix_num_threshold) {
S2130 — set curret GBi idx as pre-defined GBi idx

FIG. 22

| prediction_unit( x0, y0, nPbW, nPbH ) { | Descriptor |
|---|---|
| if( cu_skip_flag[ x0 ][ y0 ] ) { // SKIP | |
| ... | |
| } else { // MERGE | |
| ... | |
| } else { // INTER | |
| if( slice_type = = B ) { | |
| inter_pred_idc [ x0 ][ y0 ] | ae(v) |
| if( inter_pred_idc[ x0 ][ y0 ] = = PRED_BI ) { | |
| if (cur_blk_QT_size =< QT_threshold && BT_split_flag == true ) // BT split 인 경우 | ae(v) |
| set curret GBi idx from pre-defineded GBI index | |
| else | |
| gbi_idx[ x0 ][ y0 ] | ae(v) |
| } | |
| } | |
| if( inter_pred_idc[ x0 ][ y0 ] != PRED_L1 ) { | |
| if( num_ref_idx_l0_active_minus1 > 0 ) | |
| ref_idx_l0[ x0 ][ y0 ] | ae(v) |
| mvd_coding( x0, y0, 0 ) | |
| mvp_l0_flag[ x0 ][ y0 ] | ae(v) |
| } | |
| ... | |
| } | |
| } | |
| } | |

S2210 — if( inter_pred_idc[ x0 ][ y0 ] = = PRED_BI ) {
S2220 — if (cur_blk_QT_size =< QT_threshold && BT_split_flag == true )
S2230 — set curret GBi idx from pre-defineded GBI index
S2240 — gbi_idx[ x0 ][ y0 ]

METHOD AND APPARATUS FOR PERFORMING OPTIMAL PREDICTION BASED ON WEIGHT INDEX

CROSS-REFERENCE TO RELATED APPLICATIONS

This application is the National Stage filing under 35 U.S.C. 371 of International Application No. PCT/KR2017/010810, filed on Sep. 28, 2017, which claims the benefit of U.S. Provisional Applications No. 62/401,152, filed on Sep. 28, 2016, the contents of which are all hereby incorporated by reference herein in their entirety.

TECHNICAL FIELD

The present invention relates to a method and apparatus for encoding/decoding a video signal and, more particularly, to a method and apparatus for determining an optimal prediction weight in a quadtree binarytree (QTBT) structure and performing an inter prediction using the optimal prediction weight.

BACKGROUND ART

Compression encoding means a series of signal processing technology for transmitting digitalized information through a communication line or for storing digitalized information in a form appropriate to a storage medium. Media, such as video, an image, and voice, may be a target of compression encoding. Particularly, a technology that performs compression encoding on video is referred to as video compression.

Next-generation video content will have the characteristics of high spatial resolution, a high frame rate, and high dimensionality of scene representation. In order to process such contents, an enormous increase will result in terms of memory storage, a memory access rate, and processing power.

Therefore, it is necessary to design a coding tool for processing next-generation video content more efficiently.

DISCLOSURE

Technical Problem

The present invention is to propose a method of encoding, decoding a video signal more efficiently.

Furthermore, the present invention is to provide a method of obtaining an optimal predictor.

Furthermore, the present invention is to provide a method of effectively transmitting a weight index in a quadtree binarytree (QTBT) structure.

Furthermore, the present invention is to provide a method of grouping weight indices.

Technical Solution

In order to accomplish the objects, the present invention provides a method of improving coding efficiency by grouping weight indices.

Furthermore, the present invention provides a method of performing a generalized bi-directional prediction based on the number of pixels within a block.

Furthermore, the present invention provides a method of obtaining or determining a weight index based on at least one of the number of pixels within a block or prediction information of a neighboring block.

Furthermore, the present invention provides a method of performing an optimal bi-directional prediction based on at least one of the number of pixels within a block or prediction information of a neighboring block.

Furthermore, the present invention can obtain or determine a weight index based on at least one of a QT block size or BT division information.

Furthermore, the present invention provides a method of performing an optimal bi-directional prediction based on at least one of a QT block size or BT division information.

Furthermore, the present invention provides a syntax structure for defining a threshold pixel number.

Furthermore, the present invention provides a syntax structure for defining a threshold QT block size.

Advantageous Effects

The present invention can improve coding efficiency by grouping weight indices based on at least one of the number of pixels within a block or prediction information of a neighboring block in a quadtree binarytree (QTBT) structure.

Furthermore, the present invention can obtain a further improved predictor using an adaptive weight parameter in a generalized bi-prediction.

Furthermore, the present invention can obtain a further improved predictor and improve encoding efficiency of an image by adaptively determining a weight parameter for an L0 predictor and an L1 predictor.

DESCRIPTION OF DRAWINGS

FIG. 3 is a diagram illustrating a division structure of a coding unit according to an embodiment of the present invention.

FIG. 4 is an embodiment to which the present invention is applied and is a diagram for illustrating a prediction unit.

FIG. 11 is an embodiment to which the present invention is applied and shows a syntax structure in which an optimal bi-directional prediction is performed using a weight index.

FIG. 14 is an embodiment to which the present invention is applied and shows a syntax structure for defining a threshold pixel number.

FIG. 15 is an embodiment to which the present invention is applied and shows a syntax structure in which a bi-directional prediction is performed based on at least one of the number of pixels within a block or prediction information of a neighboring block.

FIG. 18 is an embodiment to which the present invention is applied and shows a syntax structure for defining a threshold QT block size.

FIG. 19 is an embodiment to which the present invention is applied and shows a syntax structure in which an optimal bi-directional prediction is performed based on at least one of a QT block size or BT division information.

FIG. 21 is an embodiment to which the present invention is applied and shows a syntax structure in which a bi-directional prediction is performed using a predetermined weight index based on the number of pixels within a block.

FIG. 22 is an embodiment to which the present invention is applied and shows a syntax structure in which a bi-directional prediction is performed using a predetermined weight index based on at least one of a QT block size or BT division information.

BEST MODE

Figure 1:
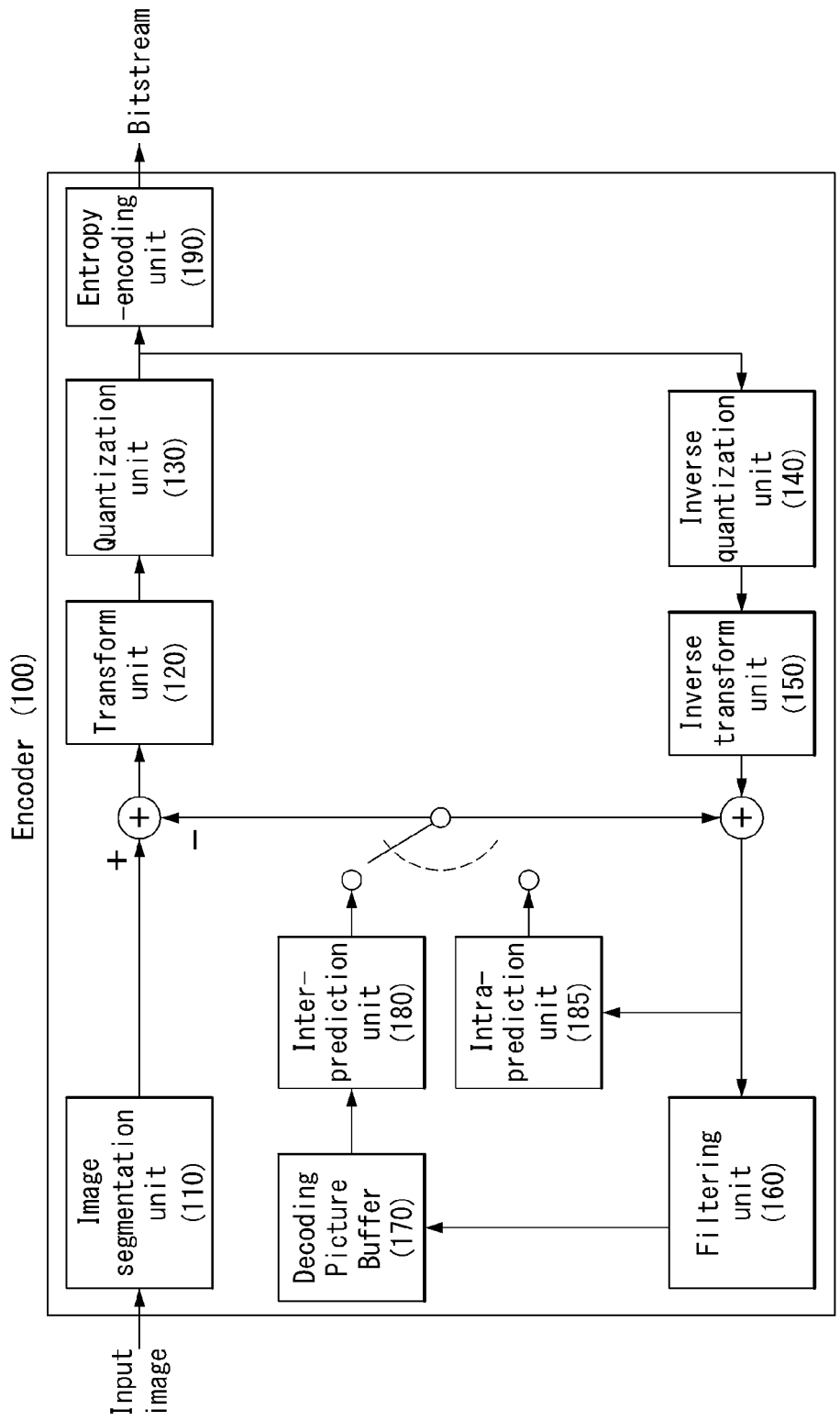
FIG. 1 is a block diagram illustrating a configuration of an encoder for encoding a video signal according to an embodiment of the present invention.

The present invention provides a method of performing a bi-directional prediction on a current block using a weight index, including checking whether a pixel number of the current block is smaller than or equal to a threshold pixel number; determining a weight index or weight value of the current block based on a weight index of a neighbor block if the pixel number of the current block is smaller than or equal to the threshold pixel number; obtaining a bi-directional predictor of the current block based on the weight index or weight value of the current block; and reconstructing the current block using the bi-directional predictor. The threshold pixel number indicates a maximum pixel number within a block, which is necessary to share a weight index between blocks.

In the present invention, the method further includes confirming whether a neighbor block having a weight index is present if the pixel number of the current block is smaller than or equal to the threshold pixel number. If the neighbor block is present, the weight index or weight value of the current block is determined based on the weight index of the neighbor block.

In the present invention, the method further includes obtaining the weight index of the current block from a slice header if the neighbor block is not present.

In the present invention, the threshold pixel number is a value obtained from a slice header or a predetermined value.

The present invention provides a method of performing bi-directional prediction on a current block using a weight index, including checking whether the size of the current block is smaller than a threshold quadtree (QT) block size, wherein the threshold QT block size indicates a minimum size of a QT block; confirming whether the current block is binarytree (BT)-split if the size of the current block is smaller than the threshold QT block size; setting at least one of a weight index or weight value having an identical value with respect to BT blocks if the current block is BT-split; obtaining a bi-directional predictor of the current block based on at least one of the weight index or the weight value; and reconstructing the current block using the bi-directional predictor.

In the present invention, the setting step includes confirming whether the current block is a first BT block. At least one of the weight index or the weight value is set using a different method based on a result of the confirmation.

In the present invention, if the current block is the first BT block, the weight index is obtained from a prediction unit. If the current block is not the first BT block, the weight index is derived from the first BT block.

In the present invention, the threshold QT block size is a value obtained from a slice header or a predetermined value.

The present invention provides an apparatus for performing bi-directional prediction on a current block using a weight index, including an inter prediction unit configured to check whether a pixel number of the current block is smaller than or equal to a threshold pixel number, determine a weight index or weight value of the current block based on a weight index of a neighbor block if the pixel number of the current block is smaller than or equal to the threshold pixel number, and obtain a bi-directional predictor of the current block based on the weight index or weight value of the current block; and a reconstruction unit configured to reconstruct the current block using the bi-directional predictor. The threshold pixel number indicates a maximum pixel number within a block, which is necessary to share a weight index between blocks.

In the present invention, the inter prediction unit is configured to confirm whether a neighbor block having a weight index is present if the pixel number of the current block is smaller than or equal to the threshold pixel number. If the neighbor block is present, the weight index or weight value of the current block is determined based on the weight index of the neighbor block.

In the present invention, the apparatus obtains the weight index of the current block from a slice header if the neighbor block is not present.

The present invention provides an apparatus for performing bi-directional prediction on a current block using a weight index, including an inter prediction unit configured to check whether the size of the current block is smaller than a threshold quadtree (QT) block size, confirm whether the current block is binarytree (BT)-split if the size of the current block is smaller than the threshold QT block size, set at least one of a weight index or weight value having an identical value with respect to BT blocks if the current block is BT-split, and obtain a bi-directional predictor of the current block based on at least one of the weight index or the weight value; and a reconstruction unit configured to reconstruct the current block using the bi-directional predictor. The threshold QT block size indicates a minimum size of a QT block.

In the present invention, the inter prediction unit is configured to confirm whether the current block is a first BT block. At least one of the weight index or the weight value is set using a different method based on a result of the confirmation.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter is applied to a reconstructed picture, and thus can improve the precision of a prediction. For example, the inter prediction unit 180 may generate an interpolated pixel by applying the interpolation filter to an integer pixel, and may perform a prediction using an interpolated block configured with interpolated pixels as a prediction block.

In an embodiment of the present invention, the inter prediction unit 180 may perform a generalized bi-prediction based on the number of pixels within a block.

Furthermore, the inter prediction unit 180 may determine a weight index based on at least one of the number of pixels within a block or prediction information of a neighboring block.

Furthermore, the inter prediction unit 180 may perform an optimal bi-directional prediction based on at least one of the number of pixels within a block or prediction information of a neighboring block.

Furthermore, the inter prediction unit 180 may determine a weight index based on at least one of a QT block size or BT division information.

Furthermore, the inter prediction unit 180 may perform an optimal bi-directional prediction based on at least one of a QT block size or BT division information.

The intra prediction unit 185 may predict a current block with reference to samples peripheral to a block to be now encoded. The intra prediction unit 185 may perform the following process in order to perform intra prediction. First, the prediction unit may prepare a reference sample necessary to generate a prediction signal. Furthermore, the prediction unit may generate a prediction signal using the prepared reference sample. Thereafter, the prediction unit encodes a prediction mode. In this case, the reference sample may be prepared through reference sample padding and/or reference sample filtering. The reference sample may include a quantization error because a prediction and reconstruction process has been performed on the reference sample. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

Figure 2:
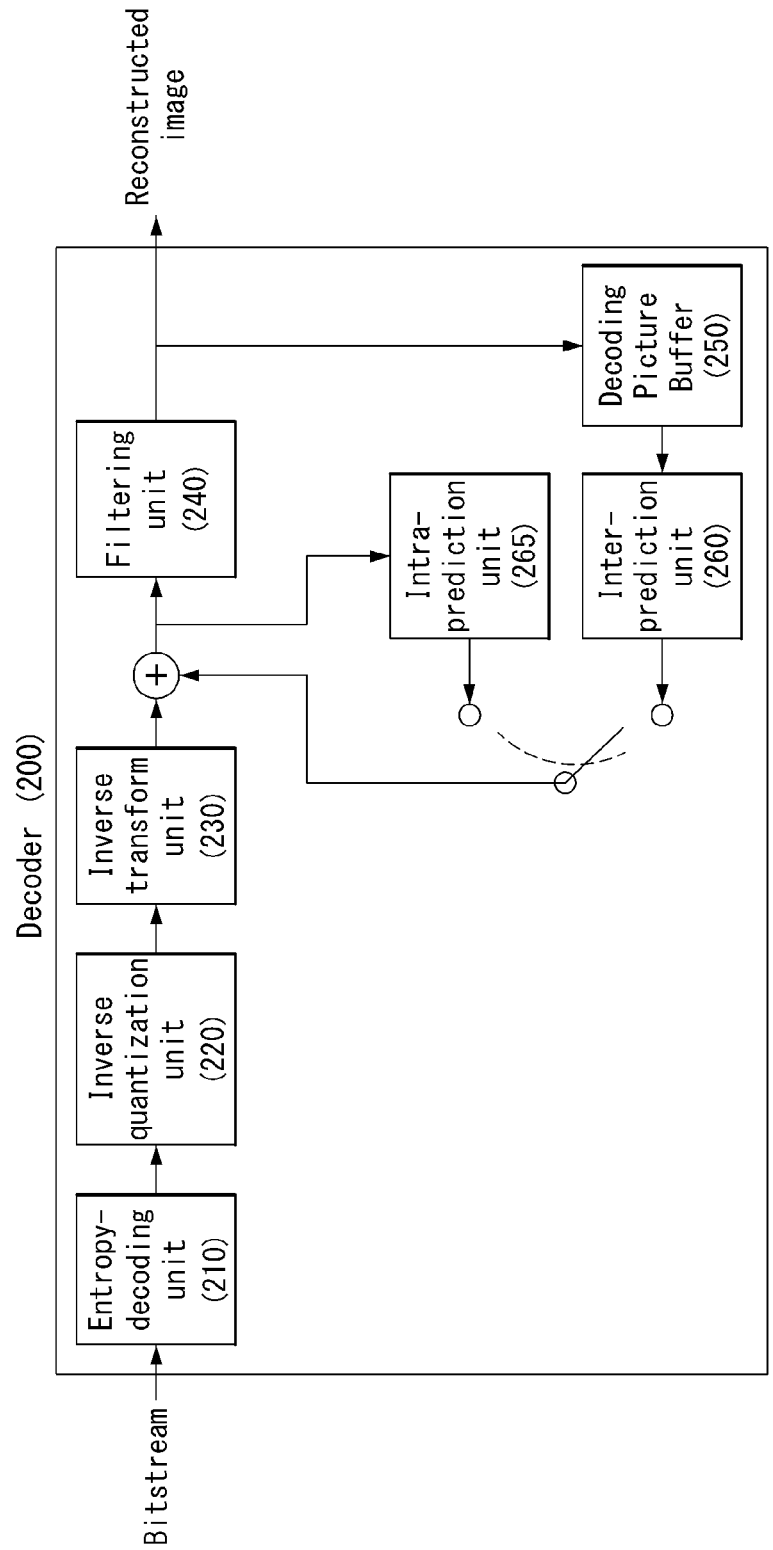
FIG. 2 is a block diagram illustrating a configuration of a decoder for decoding a video signal according to an embodiment of the present invention.

FIG. 2 is an embodiment to which the present invention is applied and shows a schematic block diagram of a decoder by which the decoding of a video signal is performed.

Referring to FIG. 2, the decoder 200 may be configured to include a parsing unit (not shown), an entropy decoding unit 210, a dequantization unit 220, an inverse transform unit 230, a filtering unit 240, a decoded picture buffer (DPB) unit 250, an inter prediction unit 260, an intra prediction unit 265 and a reconstruction unit (not shown).

For another example, the decoder 200 may be simply represented as including a parsing unit (not shown), a block split determination unit (not shown) and a decoding unit (not shown). In this case, embodiments to which the present invention is applied may be performed through the parsing unit (not shown), the block split determination unit (not shown) and the decoding unit (not shown).

The decoder 200 may receive a signal output by the encoder 100 of FIG. 1, and may parse or obtain a syntax element through the parsing unit (not shown). The parsed or obtained signal may be entropy-decoded through the entropy decoding unit 210.

The dequantization unit 220 obtains a transform coefficient from the entropy-decoded signal using quantization step size information.

The inverse transform unit 230 obtains a residual signal by inversely transforming the transform coefficient.

The reconstruction unit (not shown) generates a reconstructed signal by adding the obtained residual signal to a prediction signal output by the inter prediction unit 260 or the intra prediction unit 265.

The filtering unit 240 applies filtering to the reconstructed signal and transmits the filtered signal to a playback device or transmits the filtered signal to the decoded picture buffer unit 250. The filtered signal transmitted to the decoded picture buffer unit 250 may be used as a reference picture in the inter prediction unit 260.

In this specification, the embodiments described in the filtering unit 160, inter prediction unit 180 and intra prediction unit 185 of the encoder 100 may be identically applied to the filtering unit 240, inter prediction unit 260 and intra prediction unit 265 of the decoder, respectively.

In an embodiment of the present invention, the inter prediction unit 260 may perform a generalized bi-prediction based on the number of pixels within a block.

Furthermore, the inter prediction unit 260 may obtain or determine a weight index based on at least one of the number of pixels within a block or prediction information of a neighboring block.

Furthermore, the inter prediction unit 260 may perform an optimal bi-directional prediction based on at least one of the number of pixels within a block or prediction information of a neighboring block.

Furthermore, the inter prediction unit 260 may obtain or determine a weight index based on at least one of a QT block size or BT division information.

Furthermore, the inter prediction unit 260 may perform an optimal bi-directional prediction based on at least one of a QT block size or BT division information.

A reconstructed video signal output through the decoder 200 may be played back through a playback device.

FIG. 3 is a diagram illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in a bit stream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

FIG. 4 is an embodiment to which the present invention is applied and is a diagram for illustrating a prediction unit.

A PU is differently partitioned depending on whether an intra-prediction mode or an inter-prediction mode is used as the coding mode of a CU to which the PU belongs.

FIG. 4(a) illustrates a PU in the case where the intra-prediction mode is used as the coding mode of a CU to which the PU belongs, and FIG. 4(b) illustrates a PU in the case where the inter-prediction mode is used as the coding mode of a CU to which the PU belongs.

Referring to FIG. 4(a), assuming the case where the size of one CU is 2N×2N (N=4, 8, 16 or 32), one CU may be partitioned into two types (i.e., 2N×2N and N×N).

In this case, if one CU is partitioned as a PU of the 2N×2N form, this means that only one PU is present within one CU.

In contrast, if one CU is partitioned as a PU of the N×N form, one CU is partitioned into four PUs and a different prediction block for each PU is generated. In this case, the partition of the PU may be performed only if the size of a CB for the luma component of a CU is a minimum size (i.e., if the CU is an SCU).

Referring to FIG. 4(b), assuming that the size of one CU is 2N×2N (N=4, 8, 16 or 32), one CU may be partitioned into eight PU types (i.e., 2N×2N, N×N, 2N×N, N×2N, nL×2N, nR×2N, 2N×nU and 2N×nD).

As in intra-prediction, the PU partition of the N×N form may be performed only if the size of a CB for the luma component of a CU is a minimum size (i.e., if the CU is an SCU).

In inter-prediction, the PU partition of the 2N×N form in which a PU is partitioned in a traverse direction and the PU partition of the N×2N form in which a PU is partitioned in a longitudinal direction are supported.

Furthermore, the PU partition of nL×2N, nR×2N, 2N×nU and 2N×nD forms, that is, asymmetric motion partition (AMP) forms, are supported. In this case, 'n' means a ¼ value of 2N. However, the AMP cannot be used if a CU to which a PU belongs is a CU of a minimum size.

In order to efficiently code an input image within one CTU, an optimum partition structure of a coding unit (CU), a prediction unit (PU) and a transform unit (TU) may be determined based on a minimum rate-distortion value through the following execution process. For example, an optimum CU partition process within a 64×64 CTU is described. A rate-distortion cost may be calculated through a partition process from a CU of a 64×64 size to a CU of an 8×8 size, and a detailed process thereof is as follows.

1) A partition structure of an optimum PU and TU which generates a minimum rate-distortion value is determined by performing inter/intra-prediction, transform/quantization and inverse quantization/inverse transform and entropy encoding on a CU of a 64×64 size.

2) The 64×64 CU is partitioned into four CUs of a 32×32 size, and an optimum partition structure of a PU and a TU which generates a minimum rate-distortion value for each of the 32×32 CUs is determined.

3) The 32×32 CU is partitioned into four CUs of a 16×16 size again, and an optimum partition structure of a PU and a TU which generates a minimum rate-distortion value for each of the 16×16 CUs is determined.

4) The 16×16 CU is partitioned into four CUs of an 8×8 size again, and an optimum partition structure of a PU and a TU which generates a minimum rate-distortion value for each of the 8×8 CUs is determined.

5) An optimum partition structure of a CU within a 16×16 block is determined by comparing the rate-distortion value of a 16×16 CU calculated in the process 3) with the sum of the rate-distortion values of the four 8×8 CUs calculated in the process 4). This process is performed on the remaining three 16×16 CUs in the same manner.

6) An optimum partition structure of a CU within a 32×32 block is determined by comparing the rate-distortion value of a 32×32 CU calculated in the process 2) with the sum of the rate-distortion values of the four 16×16 CUs calculated in the process 5). This process is performed on the remaining three 32×32 CUs in the same manner.

7) Finally, an optimum partition structure of a CU within a 64×64 block is determined by comparing the rate-distortion value of the 64×64 CU calculated in the process 1) with the sum of the rate-distortion values of the four 32×32 CUs obtained in the process 6).

In the intra-prediction mode, a prediction mode is selected in a PU unit and prediction and a reconfiguration are performed in an actual TU unit with respect to the selected prediction mode.

The TU means a basic unit by which actual prediction and a reconfiguration are performed. The TU includes a transform block (TB) for a luma component and a TB for two chroma components corresponding to the TB for a luma component.

In the example of FIG. 3, as in the case where one CTU is partitioned as a quadtree structure to generate a CU, a TU is hierarchically partitioned as a quadtree structure from one CU to be coded.

The TU is partitioned as a quadtree structure, and thus a TU partitioned from a CU may be partitioned into smaller lower TUs. In HEVC, the size of the TU may be determined to be any one of 32×32, 16×16, 8×8 and 4×4.

Referring back to FIG. 3, it is assumed that the root node of a quadtree is related to a CU. The quadtree is partitioned until a leaf node is reached, and the leaf node corresponds to a TU.

More specifically, a CU corresponds to a root node and has the smallest depth (i.e., depth=0) value. The CU may not be partitioned depending on the characteristics of an input image. In this case, a CU corresponds to a TU.

The CU may be partitioned in a quadtree form. As a result, lower nodes of a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to nodes a, b and j, respectively, have been once partitioned from the CU, and have the depth of 1.

At least any one of the nodes having the depth of 1 may be partitioned in a quadtree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to nodes c, h and i, respectively, have been twice partitioned from the CU, and have the depth of 2.

Furthermore, at least any one of the nodes having the depth of 2 may be partitioned in a quadtree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to nodes d, e, f and g, respectively, have been partitioned three times from the CU, and have the depth of 3.

A TU having a tree structure has predetermined maximum depth information (or the greatest level information) and may be hierarchically partitioned. Furthermore, each partitioned TU may have depth information. The depth information may include information about the size of the TU because it indicates the partitioned number and/or degree of the TU.

Regarding one TU, information (e.g., a partition TU flag "split_transform_flag") indicating whether a corresponding TU is partitioned may be transferred to the decoder. The partition information is included in all of TUs other than a TU of a minimum size. For example, if a value of the flag indicating whether a corresponding TU is partitioned is "1", the corresponding TU is partitioned into four TUs again. If a value of the flag indicating whether a corresponding TU is partitioned is "0", the corresponding TU is no longer partitioned.

Figure 5:
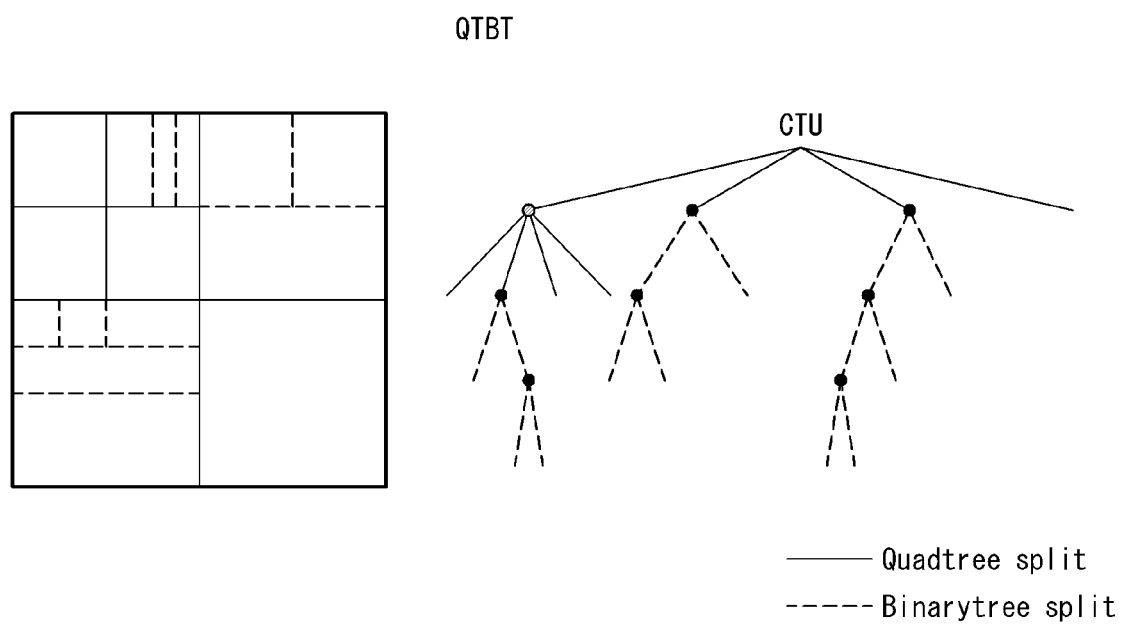
FIG. 5 is an embodiment to which the present invention is applied and is a diagram for illustrating a quadtree binarytree (hereinafter referred to as a "QTBT") block split structure.

FIG. 5 is an embodiment to which the present invention is applied and is a diagram for illustrating a quadtree binarytree (hereinafter referred to as a "QTBT") block split structure.

Quad-Tree Binary-Tree (QTBT)

A QTBT refers to a structure of a coding block in which a quadtree structure and a binarytree structure have been combined. Specifically, in a QTBT block split structure, an image is coded in a CTU unit. A CTU is split in a quadtree form. A leaf node of a quadtree is additionally split in a binarytree form.

Hereinafter, a QTBT structure and a split flag syntax supporting the same are described with reference to FIG. 5.

Referring to FIG. 5, a current block may be split in a QTBT structure. That is, a CTU may be first hierarchically split in a quadtree form. Furthermore, a leaf node of the quadtree that is no longer spit in a quadtree form may be hierarchically split in a binarytree form.

The encoder may signal a split flag in order to determine whether to split a quadtree in a QTBT structure. In this case, the quadtree split may be adjusted (or limited) by a MinQTLumaISlice, MinQTChromaISlice or MinQTNonISlice value. In this case, MinQTLumaISlice indicates a minimum size of a quadtree leaf node of a luma component in an I-slice. MinQTLumaChromaISlice indicates a minimum size of a quadtree leaf node of a chroma component in an I-slice. MinQTNonISlice indicates a minimum size of a quadtree leaf node in a non-I-slice.

In the quadtree structure of a QTBT, a luma component and a chroma component may have independent split structures in an I-slice. For example, in the case of an I-slice in the QTBT structure, the split structures of a luma component and chroma component may be differently determined. In order to support such a split structure, MinQTLumaISlice and MinQTChromaISlice may have different values.

For another example, in a non-I-slice of a QTBT, the split structures of a luma component and chroma component in the quadtree structure may be identically determined. For example, in the case of a non-I-slice, the quadtree split structures of a luma component and chroma component may be adjusted by a MinQTNonISlice value.

In the QTBT structure, a leaf node of the quadtree may be split in a binarytree form. In this case, the binarytree split may be adjusted (or limited) by MaxBTDepth, MaxBTDepthISliceL and MaxBTDepthISliceC. In this case, MaxBTDepth indicates a maximum depth of the binarytree split based on a leaf node of the quadtree in a non-I-slice. MaxBTDepthISliceL indicates a maximum depth of the binarytree split of a luma component in an I-slice. MaxBTDepthISliceC indicates a maximum depth of the binarytree split of a chroma component in the I-slice.

Furthermore, in the I-slice of a QTBT, MaxBTDepthISliceL and MaxBTDepthISliceC may have different values in the I-slice because a luma component and a chroma component may have different structures.

Furthermore, the BT of the QTBT may be split in a horizontal or vertical direction. Accordingly, it is necessary to signal split direction information (e.g., BTSplitMode) regarding that a BT will be split in which direction when the BT is split in addition to a BT division flag (e.g., BinarySplitFlag) indicating whether BT split has been performed.

In an embodiment, the QTBT structure may signal split direction information (BTSplitMode) when a BT split flag (BinarySplitFlag) is not 0. For example, a BT may be split horizontally when BTSplitMode is 0, and may be vertically split when BTSplitMode is 1.

Meanwhile, in the case of the split structure of a QTBT, the quadtree structure and the binarytree structure may be used together. In this case, the following rule may be applied.

First, MaxBTSize is smaller than or equal to MaxQTSize. In this case, MaxBTSize indicates a maximum size of a binarytree split, and MaxQTSize indicates a maximum size of the quadtree split.

Second, a leaf node of a QT becomes the root of a BT.

Third, once a split into a BT is performed, it cannot be split into a QT again.

Fourth, a BT defines a vertical split and a horizontal split.

Fifth, MaxQTDepth, MaxBTDepth are previously defined. In this case, MaxQTDepth indicates a maximum depth of a quadtree split, and MaxBTDepth indicates a maximum depth of a binarytree split.

Sixth, MaxBTSize, MinQTSize may be different depending on a slice type.

Figure 6:
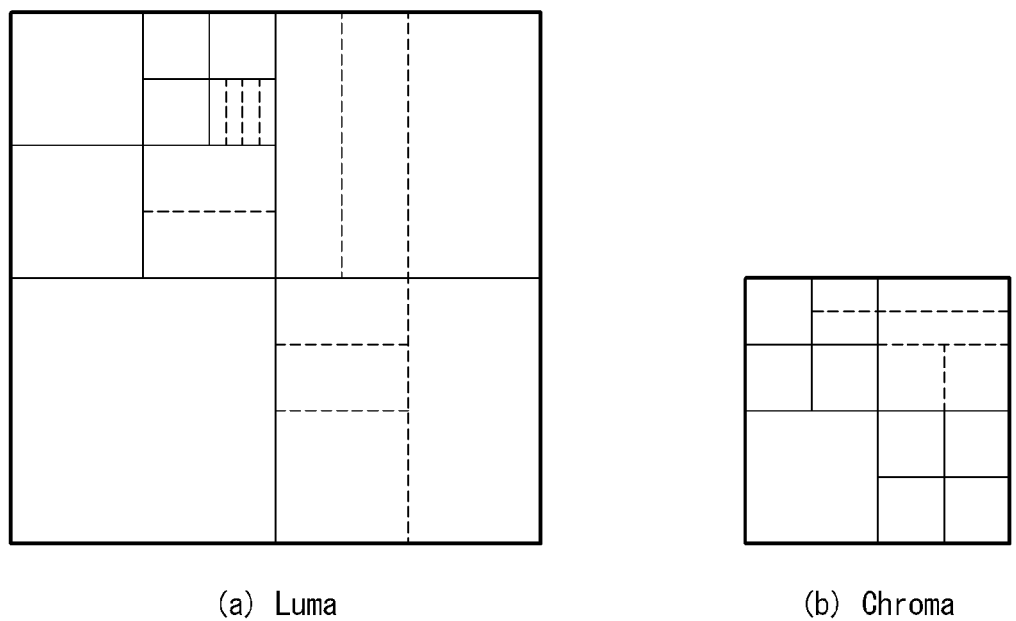
FIG. 6 is an embodiment to which the present invention is applied and is a diagram for illustrating a comparison between the block split structures of QTBTs for a luma component and a chroma component.

FIG. 6 is an embodiment to which the present invention is applied and is a diagram for illustrating a comparison between the block split structures of QTBTs for a luma component and a chroma component.

Referring to FIG. 6, it is assumed that a current slice is an I-slice. FIG. 6(a) shows the split structure of a QTBT for a luma component, and FIG. 6(b) shows the split structure of a QTBT for a chroma component. A leaf node of a quadtree split in a quadtree structure may be split in a binarytree form. As described above, in the I-slice, the luma component and chroma component may have different split structures.

Figure 7:
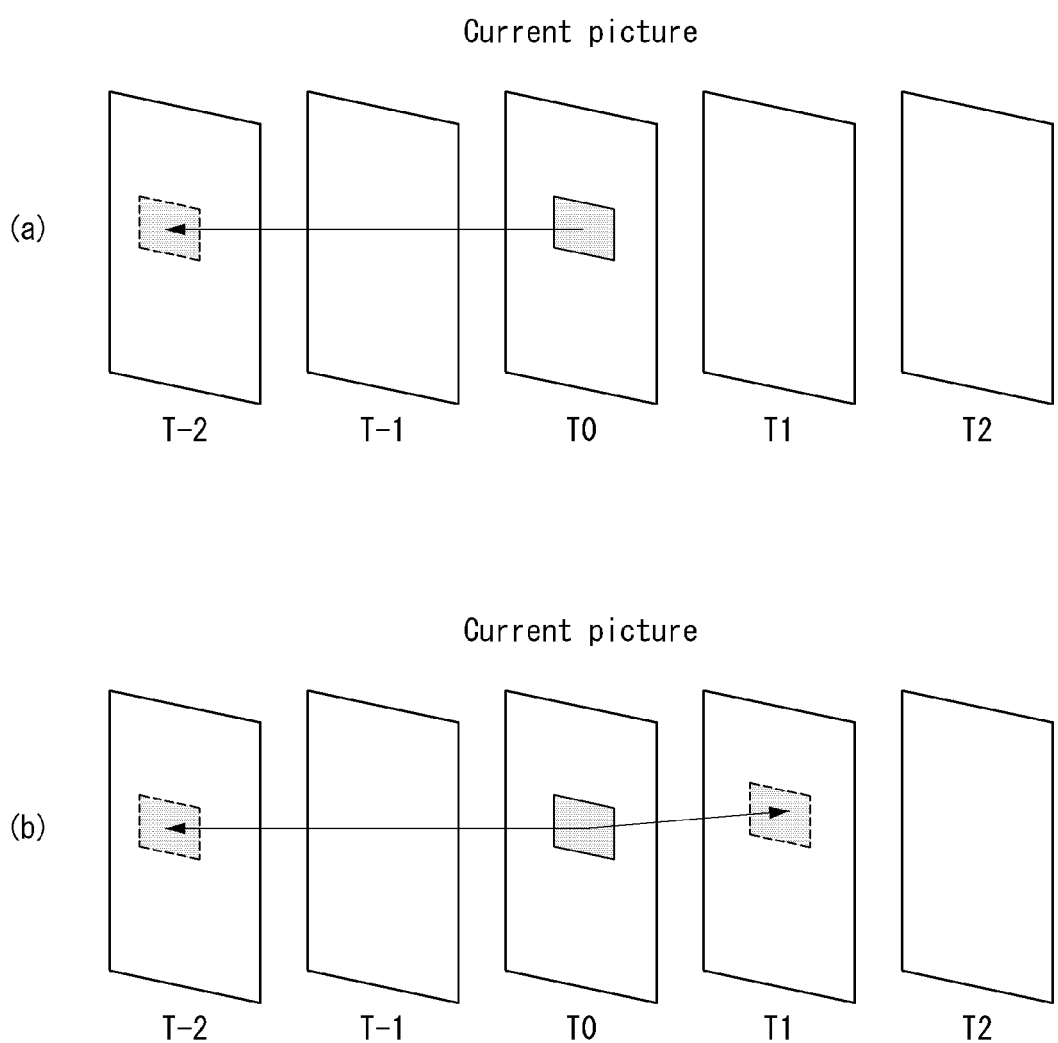
FIG. 7 is an embodiment to which the present invention is applied and is a diagram for illustrating a uni-directional inter prediction and a bi-directional inter prediction.

FIG. 7 is an embodiment to which the present invention is applied and is a diagram for illustrating a uni-directional inter prediction and a bi-directional inter prediction.

An inter prediction may be divided into a uni-directional prediction in which only one past picture or future picture is used as a reference picture on a time axis with respect to one block and a bi-directional prediction in which reference is made to the past and future pictures at the same time.

FIG. 7(a) shows a uni-directional prediction, and FIG. 7(b) shows a bi-directional prediction.

Referring to FIG. 7(a), it may be seen that a current picture is present in a T0 time and refers to a picture in a (T−2) time for inter prediction. Furthermore, referring to FIG. 7(b), it may be seen that a current picture is present in a T0 time and refers to two pictures, that is, a picture in a (T−2) time and a picture in a T1 time, for inter prediction.

Furthermore, uni-directional prediction may be divided into forward direction prediction using one reference picture displayed (or output) prior to a current picture temporally and backward direction prediction using one reference picture displayed (or output) after a current picture temporally.

In an inter prediction process (i.e., uni-directional or bi-directional prediction), a motion parameter (or information) used to specify that which reference region (or reference block) is used to predict a current block includes an inter prediction mode (in this case, the inter prediction mode may indicate a reference direction (i.e., uni-directional or bi-directional) and a reference list (i.e., L0, L1 or bi-direction)), a reference index (or reference picture index or reference list index), motion vector information. The motion vector information may include a motion vector, motion vector prediction (MVP) or a motion vector difference (MVD). The motion vector difference means a difference between a motion vector and a motion vector prediction.

In uni-directional prediction, a motion parameter for one-side direction is used. That is, one motion parameter may be necessary to specify a reference region (or reference block).

In a bi-directional prediction, a motion parameter for both-side directions is used. In a bi-directional prediction method, a maximum of two reference regions may be used. The two reference regions may be present in the same reference picture or may be present in different pictures, respectively. That is, in the bi-directional prediction method, a maximum of two motion parameters may be used. Two motion vectors may have the same reference picture index or may have different reference picture indices. In this case, both the reference pictures may be displayed (or output) prior to a current picture temporally or may be displayed (or output) after a current picture.

The encoder performs motion estimation for finding a reference region most similar to a current processing block from reference pictures in an inter prediction process. Furthermore, the encoder may provide the decoder with a motion parameter for the reference region.

The encoder or the decoder may obtain the reference region of the current processing block using the motion parameter. The reference region is present in a reference picture having the reference index. Furthermore, a pixel value or interpolated value of the reference region specified by a motion vector may be used as the predictor of the current processing block. That is, motion compensation for predicting an image of the current processing block from a previously decoded picture using motion information is performed.

In order to reduce the amount of transmission related to motion vector information, a method of obtaining a motion vector prediction (mvp) using motion information of previously coded blocks and transmitting only a difference (mvd) therefor may be used. That is, the decoder obtains a motion vector prediction of a current processing block using motion information of decoded other blocks and obtains a motion vector value for the current processing block using a difference transmitted by the encoder. In obtaining the motion vector prediction, the decoder may obtain various motion vector candidate values using motion information of already decoded other blocks, and may obtain one of the motion vector candidate values as a motion vector prediction.

Figure 8:
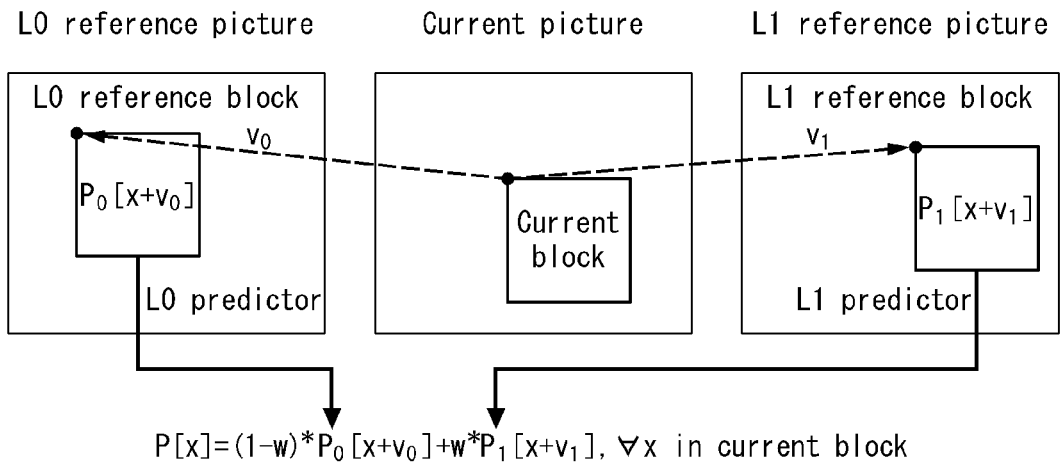
FIG. 8 is an embodiment to which the present invention is applied and is a diagram for illustrating a generalized bi-prediction method.

FIG. 8 is an embodiment to which the present invention is applied and is a diagram for illustrating a generalized bi-prediction method.

Generalized Bi-Prediction

The present invention provides a generalized bi-prediction method for obtaining a bi-directional predictor in inter coding.

Referring to FIG. 8, it is assumed that an L0 reference picture and an L1 reference picture are present with reference to a current picture. In this case, assuming that a predictor obtained from an L0 reference block is an L0 predictor and a predictor obtained from an L1 reference block is an L1 predictor, the present invention may obtain an optimal predictor by adaptively applying a weight to the L0 predictor and the L1 predictor.

In an embodiment, as in Equation 1, a bi-directional predictor may be obtained using an adaptive weight.

$$P[x]=(1-w)*P_0[x+v0]+w*P_1[x+v1] \quad \text{[Equation 1]}$$

In this case, P[x] means a predictor at the x location of a current block. $P_i[x+vi]$, $\forall i \in (0,1)$ means a motion-compensated prediction block obtained using a motion vector (MV) $v_i$ in a reference picture $L_i$. (1−w) and w mean weight values. In this case, a set W of the weight values may be configured as an embodiment like Equations 2 to 4.

$$w=\{3/8, 1/2, 5/8\} \quad \text{[Equation 2]}$$

$$w=\{1/4, 3/8, 1/2, 5/8, 3/4\} \quad \text{[Equation 3]}$$

$$w=\{-1/4, 1/4, 3/8, 1/2, 5/8, 3/4, 5/4\} \quad \text{[Equation 4]}$$

Bit allocations for the weight values of Equations 2 to 4 are the same as Tables 1 to 3, respectively.

Tables 1 to 3 show index binarization schemes for the weight values of Equations 2 to 4, respectively.

TABLE 1

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | 3/8 | 00 | 00 |
| 1 | 1/2 | 1 | 01 |
| 2 | 5/8 | 01 | 1 |

TABLE 2

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | 1/4 | 0000 | 0000 |
| 1 | 3/8 | 001 | 0001 |
| 2 | 1/2 | 1 | 01 |
| 3 | 5/8 | 01 | 1 |
| 4 | 3/4 | 0001 | 001 |

TABLE 3

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | −1/4 | 000000 | 000000 |
| 1 | 1/4 | 00001 | 000001 |
| 2 | 3/8 | 001 | 0001 |
| 3 | 1/2 | 1 | 01 |
| 4 | 5/8 | 01 | 1 |
| 5 | 3/4 | 0001 | 001 |
| 6 | 5/4 | 000001 | 00001 |

In Tables 1 to 3, mvd_l1_zero_flag is determined in a slice header. When mvd_l1_zero_flag=1, an MVD value of L0 is determined as 0 and only an MVD value of L1 is transmitted. When mvd_l1_zero_flag=0, the MVD values of L0 and L1 are transmitted.

Figure 9:
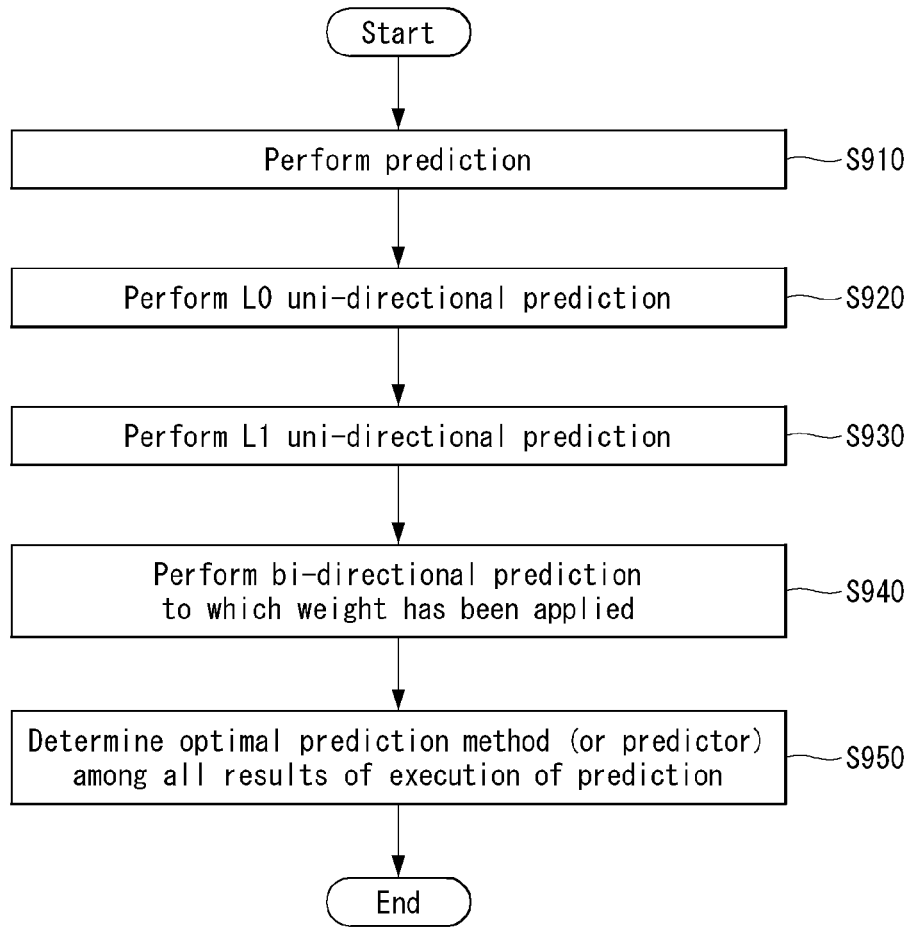
FIG. 9 is an embodiment to which the present invention is applied and is a flowchart for illustrating a process of determining an optimal prediction method.

FIG. 9 is an embodiment to which the present invention is applied and is a flowchart for illustrating a process of determining an optimal prediction method.

The present embodiment is described on the basis of the encoder, for convenience of description, but the present invention is not limited thereto and may be performed by the decoder within the range performed by the decoder.

The encoder may perform a prediction according to a skip mode or a merge mode (S910).

The encoder may perform uni-directional prediction in an L0 direction (S920) or may perform uni-directional prediction in an L1 direction (S930).

Furthermore, the encoder may perform a bi-directional prediction to which a weight has been applied (S940). In this case, a weight determination method or a bi-directional prediction method described in this specification may be applied to the bi-directional prediction to which a weight has been applied.

Steps S910 to S940 are not limited to their sequence. The encoder may perform at least one of a skip mode, a merge mode, an L0 uni-directional prediction, an L1 uni-directional prediction or a bi-directional prediction to which a weight has been applied.

The encoder may determine an optimal predictor among predictors calculated by the above-described prediction methods (S950). In this case, the optimal predictor may mean a value that minimizes a difference between a pixel value of a current block and the predictor or may mean a value that minimizes a rate-distortion (RD) cost.

Hereinafter, a weight determination method in order to obtain an optimal predictor and a method of performing a bi-directional prediction to which a weight has been applied are described.

Figure 10:
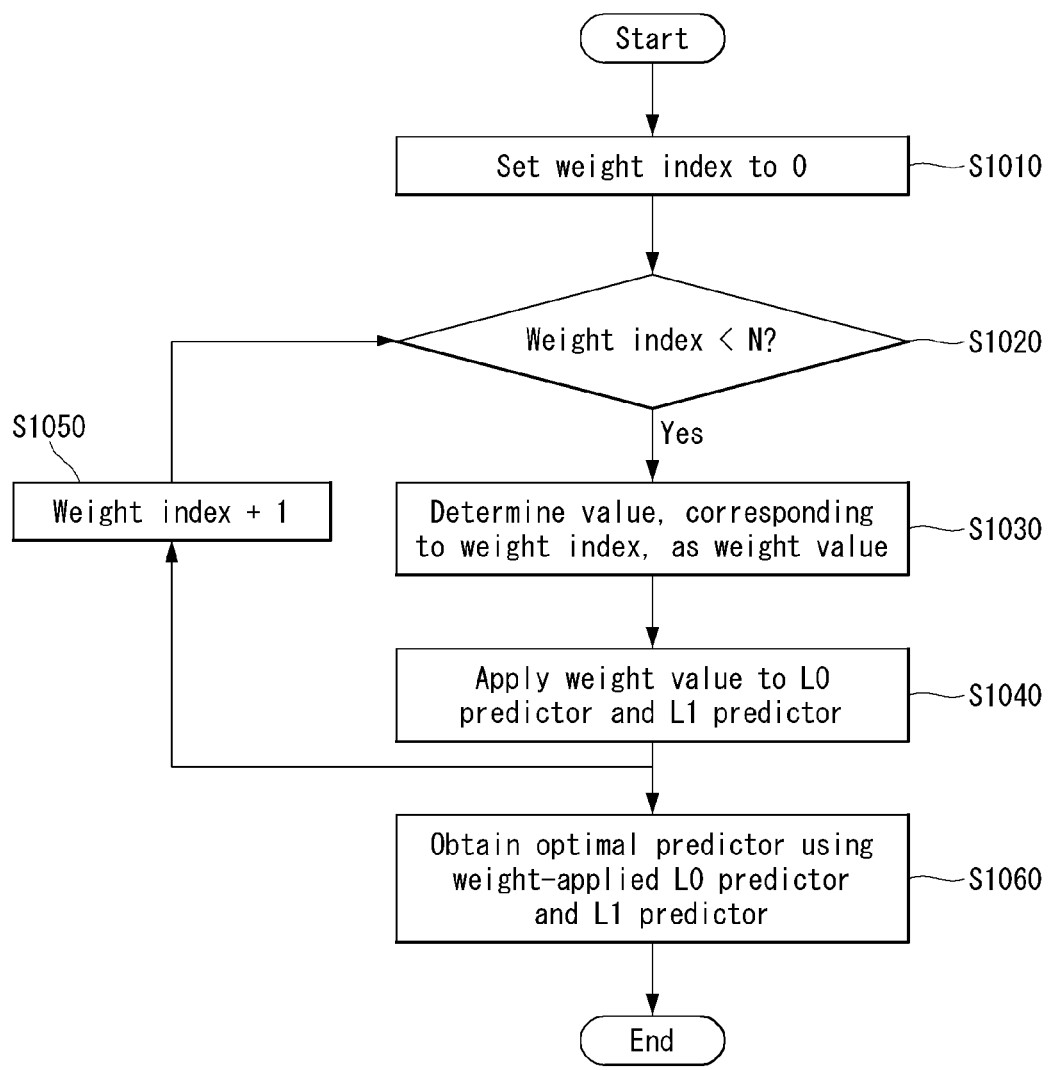
FIG. 10 is an embodiment to which the present invention is applied and is a flowchart for illustrating a process of performing an optimal bi-directional prediction using a weight index.

FIG. 10 is an embodiment to which the present invention is applied and is a flowchart for illustrating a process of performing an optimal bi-directional prediction using a weight index.

As described FIG. 9, the encoder may perform at least one of a skip mode, a merge mode, an L0 uni-directional prediction, an L1 uni-directional prediction or a bi-directional prediction to which a weight has been applied, and may determine an optimal predictor among them.

In this case, in the case of the bi-directional prediction to which a weight has been applied, the weight may be determined based on any one of Tables 1 to 3. For example, in the case of Table 3, the weight index may be set to 0 to 6. In this case, the weight may mean a value corresponding to the weight index.

An embodiment of the present invention provides a method of obtaining an optimal predictor based on a bi-directional prediction to which a weight has been applied.

Referring to FIG. 10, the encoder may first set a weight index to 0 (S1010).

The encoder may check whether the weight index is smaller than N (S1020). For example, if the weight indices of Table 3 are used, the N value may be 7.

When the weight index is smaller than 7, the encoder may determine a value, corresponding to the weight index, as a weight value (S1030).

Furthermore, the encoder may apply the weight value to an L0 predictor and an L1 predictor (S1040). In this case, Equation 1 may be used.

The encoder adds 1 to the weight value and may perform steps S1020 to S1040 again.

The encoder may obtain an optimal predictor among predictors obtained through the loop process (S1060). In this case, the optimal predictor may be calculated based on a weight-applied L0 predictor and L1 predictor. The finally determined weight value may mean a value that minimizes a difference between a pixel value of the current block and the predictor or may mean a value that minimizes a rate-distortion (RD) cost. Furthermore, a weight index corresponding to the finally determined weight value may mean an optimal weight index.

Furthermore, if the weight indices of Table 3 are used, the encoder may repeatedly perform steps S1020 to S1050 while a weight index has the value of 0~6.

The present invention is not limited thereto. If the weight indices of Table 1 and Table 2 are used, the same method may be applied.

FIG. 11 is an embodiment to which the present invention is applied and shows a syntax structure in which an optimal bi-directional prediction is performed using a weight index.

An embodiment of the present invention provides a method of performing a bi-directional prediction using a weight index, and provides a method of defining a weight index in the decoder.

First, the decoder may confirm which prediction method is used with respect to a current prediction unit. For example, any one of an L0 uni-directional prediction, an L1 uni-directional prediction or a bi-directional prediction may be used as a prediction method.

Referring to FIG. 11, the decoder may confirm whether a bi-directional prediction is performed (S1110). For example, the decoder may confirm whether a bi-directional prediction is performed through if(inter_pred_idc[x0][y0]== PRED_BI). In this case, inter_pred_idc may mean whether an an L0 bi-directional prediction, an L1 bi-directional prediction or a bi-directional prediction is used in a current prediction unit, and PRED_BI may mean a bi-directional prediction.

If a bi-directional prediction is performed according to step S1110, the decoder may extract a weight index (S1120). In this case, the weight index may be represented as gbi_idx [x0][y0]. For example, the weight index may be defined according to the embodiments of Tables 1 to 3.

When the weight index is extracted, the decoder may derive a weight value corresponding to the weight index.

The decoder may obtain a bi-directional predictor by applying the weight value to an L0 predictor and an L1 predictor. In this case, Equation 1 may be used.

The decoder may reconstruct a current block using the bi-directional predictor.

Figure 12:
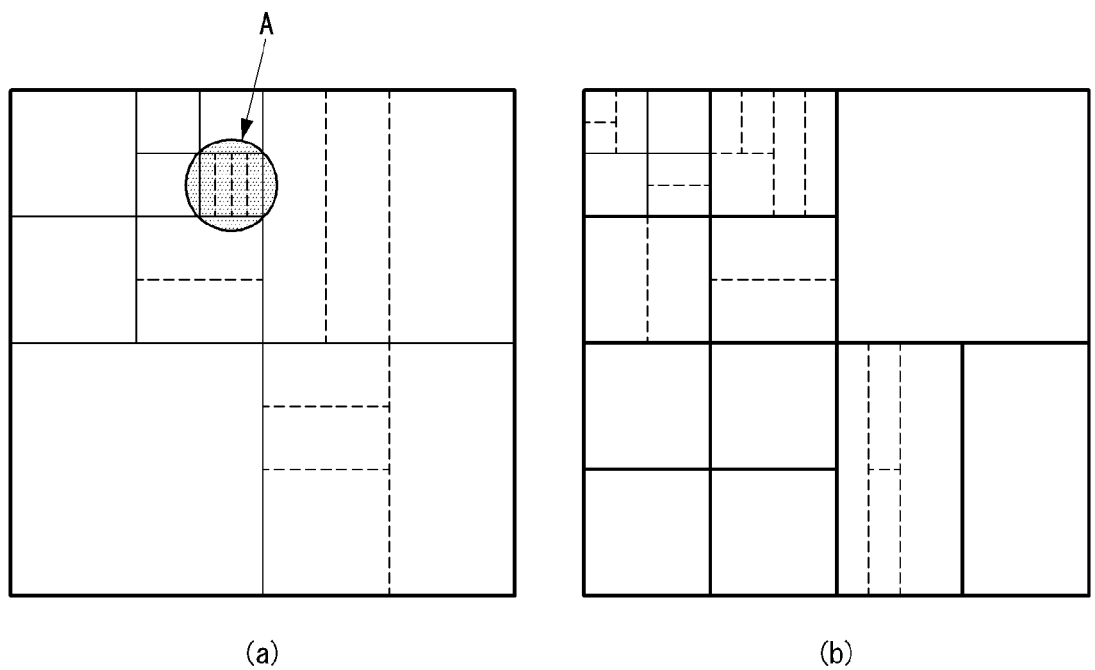
FIG. 12 is an embodiment to which the present invention is applied and is a diagram for illustrating the need to group weight indices in a QTBT structure.

FIG. 12 is an embodiment to which the present invention is applied and is a diagram for illustrating the need to group weight indices in a QTBT structure.

The present invention provides a method of improving coding efficiency by grouping weight indices.

In a generalized bi-prediction (GBI), a weight index may be determined in a coding block unit and transmitted. In this specification, the weight index may be called a GBI index.

However, when a coding block is small, a weight index corresponds to relatively large side information, and may deteriorate coding efficiency. For example, from FIG. 12(a), it may be seen that in the case of a region A, a 16×16 QT block has been additionally split into four 4×16 BT blocks. As in the region A, in a small region, the probability that the weight indices of BT blocks are similar and the BT blocks may have the same weight index is good. In such a case, to transmit a weight index every four BT blocks deteriorates coding efficiency.

Accordingly, the present invention provides a method of grouping coding blocks and sharing a single weight index in order to transmit a weight index more effectively by taking a QTBT structure into consideration.

In another embodiment, the present invention provides a method of performing a generalized bi-directional prediction based on the number of pixels within a block.

The present invention may define a threshold for the number of pixels within a block in a slice header. In this specification, this may be called a threshold pixel number and may be called a general term, such as a first threshold, in some cases. For example, the encoder or the decoder may compare the number of pixels of a coding block with a threshold pixel number. That is, the encoder or the decoder may check whether the number of pixels of a coding block is equal to or smaller than a threshold pixel number. In this case, the coding block may correspond to any one of a CTU, CU, PU, TU or block, and may be properly interpreted according to circumstances.

If, as a result of the comparison, the number of pixels of a coding block is equal to or smaller than the threshold pixel number, the encoder or the decoder may not transmit a separate weight index with respect to the coding block. That is, the weight index of the coding block may be set identically with the weight index of a neighboring block or may be derived from the weight index of a neighboring block. Alternatively, the weight index of the coding block may be directly derived or obtained from a weight value or weight index of a neighboring block without a weight index. Alternatively, the encoder or the decoder may use a predetermined weight index.

In contrast, if, as a result of the comparison, the number of pixels of a coding block is greater than the threshold pixel number, the encoder may set a weight index for the coding block and transmit it to the decoder.

Referring to FIG. 12(b), a weight index may be transmitted with respect to only a block indicated by a thick line, and subblocks within the block indicated by the thick line may share a single weight index. For example, the single weight index may be derived from a neighboring block or may be an already determined value.

In an embodiment, assuming that a threshold pixel number is 256, blocks indicated in bold type as in Table 4 may share a weight index. That is, when the number of pixels within a block is equal to 256 or smaller than 256, a weight index may be shared.

TABLE 4

| QT | BT |
|---|---|
| 128 × 128 | 128 × 128, 128 × 64, 128 × 32 |
|  | 64 × 128, 64 × 64, 64 × 32 |
|  | 32 × 128, 32 × 64, 32 × 32 |
| 64 × 64 | 16 × 16, 16 × 32, 16 × 64 |
|  | 32 × 16, 32 × 32, 32 × 64 |
|  | 64 × 16, 64 × 32, 64 × 64 |
| 32 × 32 | 8 × 8, 8 × 16, 8 × 32 |
|  | 16 × 8, 16 × 16, 16 × 32 |
|  | 32 × 8, 32 × 16, 32 × 32 |
| 16 × 16 | 4 × 4, 4 × 8, 4 × 16, |
|  | 8 × 4, 8 × 8, 8 × 16 |
|  | 16 × 4, 16 × 8, 16 × 16 |
| 8 × 8 | 4 × 4, 4 × 8, 8 × 4, 8 × 8 |

Figure 13:
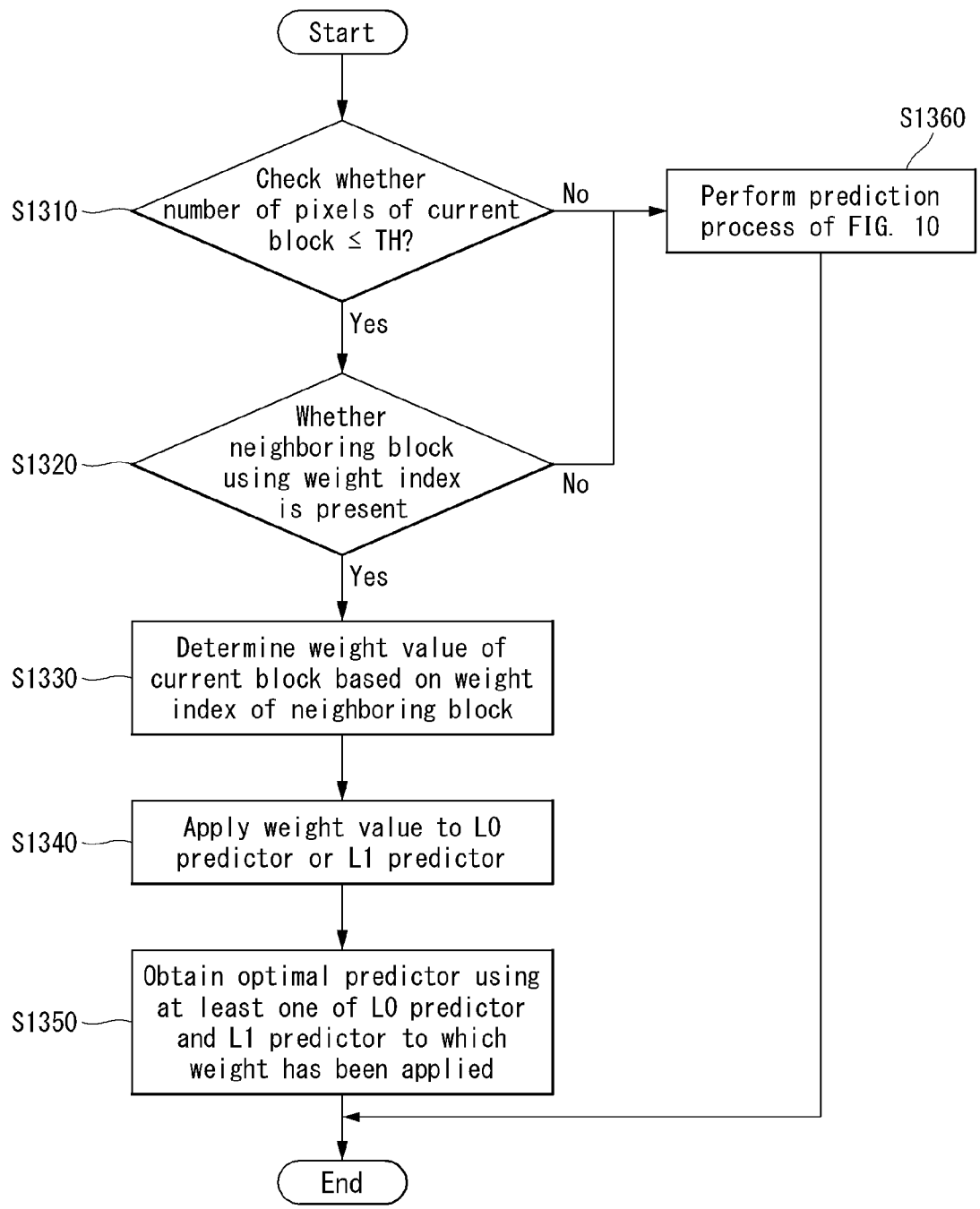
FIG. 13 is an embodiment to which the present invention is applied and is a flowchart for illustrating a process of performing a bi-directional prediction based on at least one of the number of pixels within a block or prediction information of a neighboring block.

FIG. 13 is an embodiment to which the present invention is applied and is a flowchart for illustrating a process of performing a bi-directional prediction based on at least one of the number of pixels within a block or prediction information of a neighboring block.

The present invention provides a method of determining a weight index based on at least one of the number of pixels within a block or prediction information of a neighboring block.

First, the encoder or the decoder may check whether the number of pixels of a current block is smaller than or equal to a threshold pixel number (S1310).

If, as a result of the check in step S1310, the number of pixels of the current block is smaller than or equal to the threshold pixel number, the encoder or the decoder may confirm whether a neighboring block having (or using) a weight index is present (S1320).

If, as a result of the confirmation in step S1320, a neighboring block having a weight index is present, the encoder or the decoder may determine a weight value of the current block based on the weight index of the neighboring block (S1330). For example, the encoder or the decoder may set the weight index of the neighboring block as the weight index of the current block, and may obtain or derive a weight value corresponding to the weight index of the current block. Alternatively, the encoder or the decoder may set or derive a weight value, corresponding to the weight index of the neighboring block, as a weight value of the current block.

The encoder or the decoder may apply the weight value of the current block to at least one of an L0 predictor or an L1 predictor (S1340), and may obtain an optimal predictor using at least one of the L0 predictor or the L1 predictor to which the weight has been applied (S1350).

Meanwhile, if, as a result of the check in step S1310, the number of pixels of the current block is greater than the threshold pixel number, the encoder or the decoder may obtain an optimal predictor through the prediction process of FIG. 10 (S1360).

Furthermore, if, as a result of the confirmation in step S1320, a neighboring block having a weight index is not present, the encoder or the decoder may obtain an optimal predictor through the prediction process of FIG. 10 (S1360).

FIG. 14 is an embodiment to which the present invention is applied and shows a syntax structure for defining a threshold pixel number.

The present invention provides a syntax structure for defining a threshold pixel number. In this case, the threshold pixel number may mean a threshold for the number of pixels within a block. The threshold pixel number may be used to determine whether to set (or transmit) a weight index with respect to a block or may be used to determine whether to share a weight index.

In an embodiment, the threshold pixel number may be defined in a slice header, but the present invention is not limited thereto. The threshold pixel number may be defined in at least one of a sequence parameter set, a picture parameter set, a slice header, a coding unit, a prediction unit, or a transform unit.

For another example, the threshold pixel number is not transmitted as a syntax element and may be information already known by the encoder and/or the decoder or may be information derived from the encoder and/or the decoder.

Referring to FIG. 14, a slice type may be confirmed in a slice segment header (or slice header). When slice_type=P or B, the decoder may confirm whether slice_type=B (S1410). However, the present invention is not limited thereto, and a slice type may be independently confirmed in step S1410.

When slice_type=B, the decoder may check (or obtain, extract, parse) a threshold pixel number (S1420). The threshold pixel number may be represented as pix_num_threshold.

FIG. 15 is an embodiment to which the present invention is applied and shows a syntax structure in which a bi-directional prediction is performed based on at least one of the number of pixels within a block or prediction information of a neighboring block.

An embodiment of the present invention provides a method of performing a bi-directional prediction based on at least one of the number of pixels within a block or prediction information of a neighboring block and provides a method of defining a weight index in the decoder.

First, the decoder may confirm which prediction method is used for a current prediction unit. For example, any one of an L0 bi-directional prediction, an L1 bi-directional prediction or a bi-directional prediction may be used as a prediction method.

Referring to FIG. 15, the decoder may confirm whether a bi-directional prediction is performed (S1510). For example, whether a bi-directional prediction is performed through if(inter_pred_idc[x0][y0]==PRED_BI) may be confirmed. In this case, inter_pred_idc may mean whether an L0 bi-directional prediction, an L1 bi-directional prediction or a bi-directional prediction is used for the current prediction unit. PRED_BI may mean a bi-directional prediction.

If the bi-directional prediction is performed in step S1510, the decoder may check whether the number of pixels of the current block is smaller than or equal to a threshold pixel number (S1520). For example, whether the number of pixels of the current block is smaller than or equal to the threshold pixel number may be checked through (cur_pix_num=<pix_num_threshold). In this case, cur_pix_num indicates the number of pixels of the current block, and pix_num_threshold indicates the threshold pixel number.

If, as a result of the check in step S1520, the number of pixels of the current block is smaller than or equal to the threshold pixel number, the decoder may confirm whether a neighboring block having a weight index is present (S1530). For example, whether a neighboring block having a weight index is present may be confirmed through if (neighbourBlockHasGBildx( )). In this case, neighbourBlockHasGBildx( ) may mean a function or a value indicating whether a neighboring block having a weight index is present.

If, as a result of the confirmation in step S1530, a neighboring block having a weight index is present, the decoder may determine a weight value of the current block based on the weight index of the neighboring block (S1540).

For example, the decoder may set the weight index of the neighboring block as the weight index of the current block.

For another example, the decoder may obtain or derive a weight value corresponding to the weight index of the current block. Alternatively, a weight value corresponding to the weight index of the current block may set or derived as the weight value of the current block.

Meanwhile, if, as a result of the check in step S1520, the number of pixels of the current block is greater than the threshold pixel number, the decoder may obtain (extract or parse) a weight index (S1550).

Furthermore, if, as a result of the check in step S1530, a neighboring block having a weight index is not present, the decoder may obtain (extract or parse) a weight index (S1550).

When the weight index is obtained, the decoder may derive a weight value corresponding to the weight index.

The decoder may obtain a bi-directional predictor by applying the weight value to an L0 predictor and an L1 predictor. In this case, the bi-directional predictor may correspond to an optimal predictor.

The decoder may reconstruct the current block using the bi-directional predictor.

Figure 16:
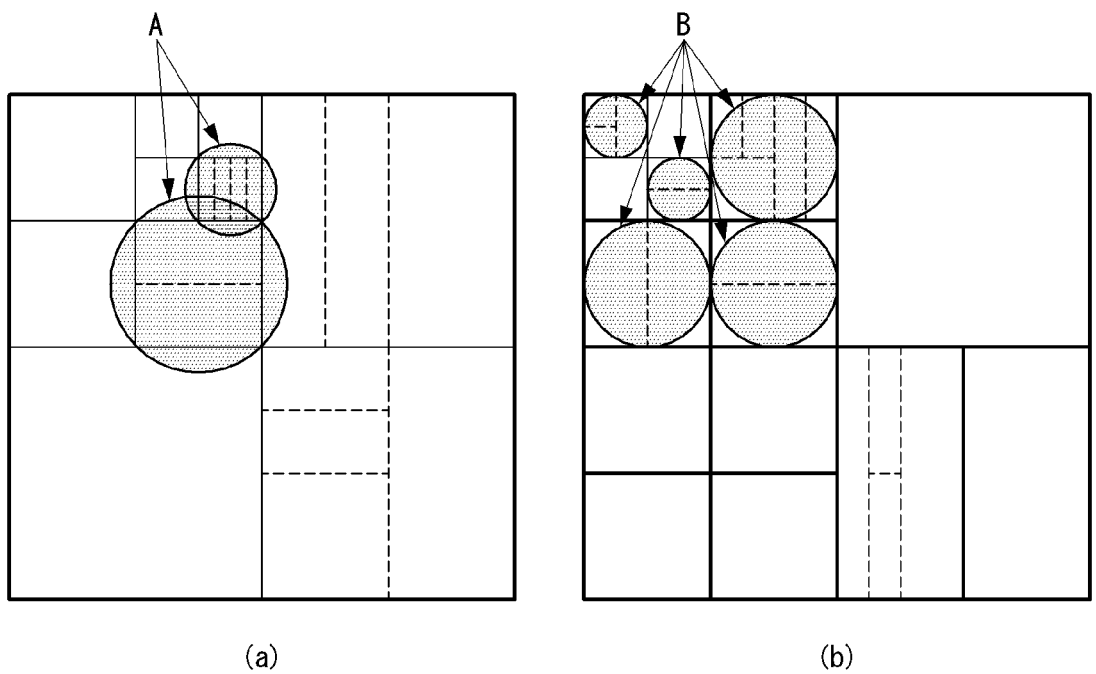
FIG. 16 is an embodiment to which the present invention is applied and shows a case where a weight index is shared when a threshold QT block size is 16×16.

FIG. 16 is an embodiment to which the present invention is applied and shows a case where a weight index is shared when a threshold QT block size is 16×16.

The present invention provides a method of performing an optimal bi-directional prediction based on at least one of a QT block size or BT division information.

In an embodiment of the present invention, a threshold QT block size may be defined, and whether to group weight indices based on the threshold QT block size may be determined.

The encoder or the decoder may determine whether to group weight indices based on block size information. In this case, the block size information may include at least one of the size of a current block, a QT block size, or a BT block size. The QT block means a QT-split subblock, and the BT block means a BT-split subblock.

The encoder may transmit a threshold QT block size and compare the size of a current block with the threshold QT block size. For example, the encoder may check whether the size of the current block is smaller than (or smaller than or equal to) the threshold QT block size. In this case, the threshold QT block size may mean a minimum size of the QT block, but the present invention is not limited thereto. The threshold QT block size may be a value already determined in the encoder and/or the decoder. For example, the threshold QT block size may be defined in at least one of height information or width information.

When the size of the current block is smaller than (or smaller than or equal to) the threshold QT block size, the encoder may confirm whether the current block is BT-split. For example, if the current block is BT-split, the encoder may set the same weight index with respect to BT blocks. That is, the BT blocks share the same weight index.

In an embodiment, when the threshold QT block size is 16×16 and the size of a QT-split subblock is 16×16 or 8×8, the encoder may confirm whether the current block is BT-split. Furthermore, when the current block is BT-split, the encoder may set the same weight index with respect to BT blocks. In this case, BT blocks within one QT block have the same weight index. In this case, one of all candidate weight indices may be selected as the weight index, or the weight index may be an already determined value.

Referring to Table 5, BT blocks (4×4, 4×8, 4×16, 8×4, 8×8, 8×16, 16×4, 16×8) within a 16×16 QT block may have the same weight index. Furthermore, BT blocks (4×4, 4×8, 8×4) within an 8×8 QT block may have the same weight index.

TABLE 5

| QT | BT |
|---|---|
| 128 × 128 | 128 × 128, 128 × 64, 128 × 32 |
|  | 64 × 128, 64 × 64, 64 × 32 |
|  | 32 × 128, 32 × 64, 32 × 32 |
| 64 × 64 | 16 × 16, 16 × 32, 16 × 64 |
|  | 32 × 16, 32 × 32, 32 × 64 |
|  | 64 × 16, 64 × 32, 64 × 64 |
| 32 × 32 | 8 × 8, 8 × 16, 8 × 32 |
|  | 16 × 8, 16 × 16, 16 × 32 |
|  | 32 × 8, 32 × 16, 32 × 32 |
| 16 × 16 | 4 × 4, 4 × 8, 4 × 16, |
|  | 8 × 4, 8 × 8, 8 × 16 |
|  | 16 × 4, 16 × 8, 16 × 16 |
| 8 × 8 | 4 × 4, 4 × 8, 8 × 4, 8 × 8 |

In an embodiment, assuming that a threshold QT block size is 16×16, in FIG. 16(a), in the case of a region A, BT blocks within the region A may have the same weight index.

Likewise, in FIG. 16(b), in the case of a region B, BT blocks within the region B may have the same weight index.

Figure 17:
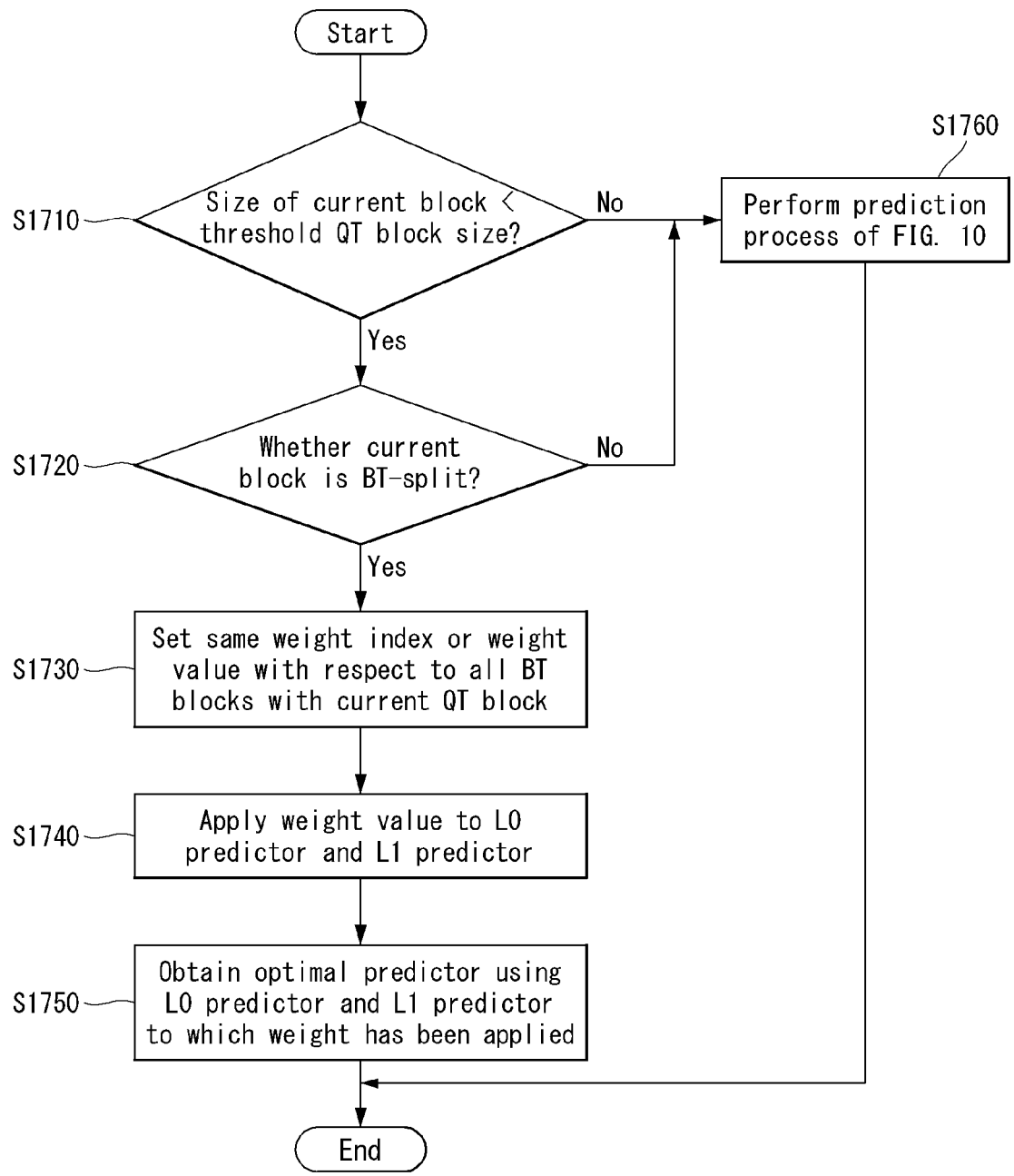
FIG. 17 is an embodiment to which the present invention is applied and is a flowchart for illustrating a process of performing an optimal bi-directional prediction based on at least one of a QT block size or BT division information.

FIG. 17 is an embodiment to which the present invention is applied and is a flowchart for illustrating a process of performing an optimal bi-directional prediction based on at least one of a QT block size or BT division information.

The present invention provides a method of performing an optimal bi-directional prediction based on at least one of a QT block size or BT division information.

First, the encoder may check whether the size of the current block is smaller than (or smaller than or equal to) a threshold QT block size (S1710). In this case, the threshold QT block size may mean a minimum size of a QT block. For example, the threshold QT block size may be defined in at least one of height information or width information.

If, as a result of the check in step S1710, the size of the current block is smaller than (or smaller than or equal to) the threshold QT block size, the encoder may confirm whether the current block is BT-split (S1720).

In the present embodiment, step S1710 and step S1720 are divided and described, but the present invention is not limited thereto. For example, whether the two steps are satisfied based on one condition may be confirmed.

If, as a result of the check in step S1720, the current block is BT-split, the encoder may set at least one of the same weight index or weight value with respect to BT blocks (S1730). That is, the BT blocks share at least one of the same weight index or the weight value.

The encoder may apply a weight value of the current block to at least one of an L0 predictor or an L1 predictor (S1740), and may obtain an optimal predictor using at least one of the L0 predictor or the L1 predictor to which the weight has been applied (S1750).

Meanwhile, if, as a result of the check in step S1710, the size of the current block is greater than the threshold QT block size, the encoder may obtain an optimal predictor through the prediction process of FIG. 10 (S1760).

Furthermore, if, as a result of the confirmation in step S1720, the current block is not BT-split, the encoder may obtain an optimal predictor through the prediction process of FIG. 10 (S1760).

FIG. 18 is an embodiment to which the present invention is applied and shows a syntax structure for defining a threshold QT block size.

The present invention provides a syntax structure for defining a threshold QT block size. In this case, the threshold QT block size may mean a minimum size of a QT block. For example, the threshold QT block size may be defined in at least one of height information or width information.

The threshold QT block size may be used to determine whether to set (or transmit) a weight index with respect to a block or may be used to determine whether to share a weight index.

In an embodiment, the threshold QT block size may be defined in a slice header, but the present invention is not limited thereto. The threshold QT block size may be defined in at least one of a sequence parameter set, a picture parameter set, a slice header, a coding unit, a prediction unit, or a transform unit.

For another example, the threshold QT block size is not transmitted as a syntax element, and may be information already known to the encoder and/or the decoder or may be information derived in the encoder and/or the decoder.

Referring to FIG. 18, a slice type may be confirmed in a slice segment header (or slice header). When slice_type=P or B, the decoder may confirm whether slice_type=B (S1810). However, the present invention is not limited thereto, and step S1810 may be independently confirmed.

When slice_type=B, the decoder may check (or obtain, extract, parse) a threshold QT block size (S1820). The threshold QT block size may be represented as QT_size_threshold.

FIG. 19 is an embodiment to which the present invention is applied and shows a syntax structure in which an optimal bi-directional prediction is performed based on at least one of a QT block size or BT division information.

The present invention provides a method of performing an optimal bi-directional prediction based on at least one of a QT block size or BT division information, and provides a method of defining a weight index in the decoder.

First, the decoder may confirm which prediction method is used for a current prediction unit. For example, any one of an L0 bi-directional prediction, an L1 bi-directional prediction or a bi-directional prediction may be used as a prediction method.

Referring to FIG. 19, the decoder may confirm whether a bi-directional prediction is performed (S1910). For example, whether a bi-directional prediction is performed through if(inter_pred_idc[x0][y0]==PRED_BI). In this case, inter_pred_idc may mean whether an L0 bi-directional prediction, an L1 bi-directional prediction or a bi-directional prediction is used for a current prediction unit. PRED_BI may mean a bi-directional prediction.

If a bi-directional prediction is performed in step S1910, the decoder may confirm at least one of whether the size of a current block is smaller than (or smaller than or equal to) a threshold QT block size or whether the current block is BT-split (S1920). In the present embodiment, a case where whether the two conditions are satisfied is confirmed is described, but the present invention is not limited thereto. For example, whether the two conditions are satisfied may be confirmed through if (cur_blk_QT_size=<QT_threshold && BT_split_flag==true).

If the two conditions are satisfied, the decoder may set at least one of the same weight index or weight value with respect to BT blocks. That is, the BT blocks share at least one of the same weight index or the weight value.

For another example, if the two conditions are satisfied, the decoder may check whether the current block is the first BT block (S1930). For example, whether the current block is the first BT block may be checked through if (isFirstBtBlkOfThisQtBlk).

If the current block is the first BT block, the decoder may obtain (or extract) a weight index (S1940). In this case, BT blocks within the current block may share the weight index. That is, the same weight value corresponding to the weight index is used.

In contrast, if the current block is not the first BT block, the weight index of the current block may be derived from the first BT block (S1950).

Meanwhile, if, as a result of the check in step S1920, the two conditions are not satisfied, the decoder may obtain (extract or parse) a weight index (S1960).

When the weight index is obtained, the decoder may derive a weight value corresponding to the weight index.

The decoder may obtain a bi-directional predictor by applying the weight value to an L0 predictor and an L1 predictor. In this case, the bi-directional predictor may correspond to an optimal predictor.

The decoder may reconstruct the current block using the bi-directional predictor.

In another embodiment of the present invention, a method of combining the embodiment of FIG. 13 and the embodiment of FIG. 17 is used.

For example, assuming that the threshold pixel number is 256 in the embodiment of FIG. 13 and the threshold QT block size is 32×32 in the embodiment of FIG. 17, as in Table 6, BTs having sizes indicated in bold type have the same weight index or weight value.

TABLE 6

| QT | BT |
| --- | --- |
| 128 × 128 | 128 × 128, 128 × 64, 128 × 32 |
|  | 64 × 128, 64 × 64, 64 × 32 |
|  | 32 × 128, 32 × 64, 32 × 32 |
| 64 × 64 | 16 × 16, 16 × 32, 16 × 64 |
|  | 32 × 16, 32 × 32, 32 × 64 |
|  | 64 × 16, 64 × 32, 64 × 64 |
| 32 × 32 | 8 × 8, 8 × 16, 8 × 32 |
|  | 16 × 8, 16 × 16, 16 × 32 |
|  | 32 × 8, 32 × 16, 32 × 32 |
| 16 × 16 | 4 × 4, 4 × 8, 4 × 16, |
|  | 8 × 4, 8 × 8, 8 × 16 |
|  | 16 × 4, 16 × 8, 16 × 16 |
| 8 × 8 | 4 × 4, 4 × 8, 8 × 4, 8 × 8 |

Figure 20:
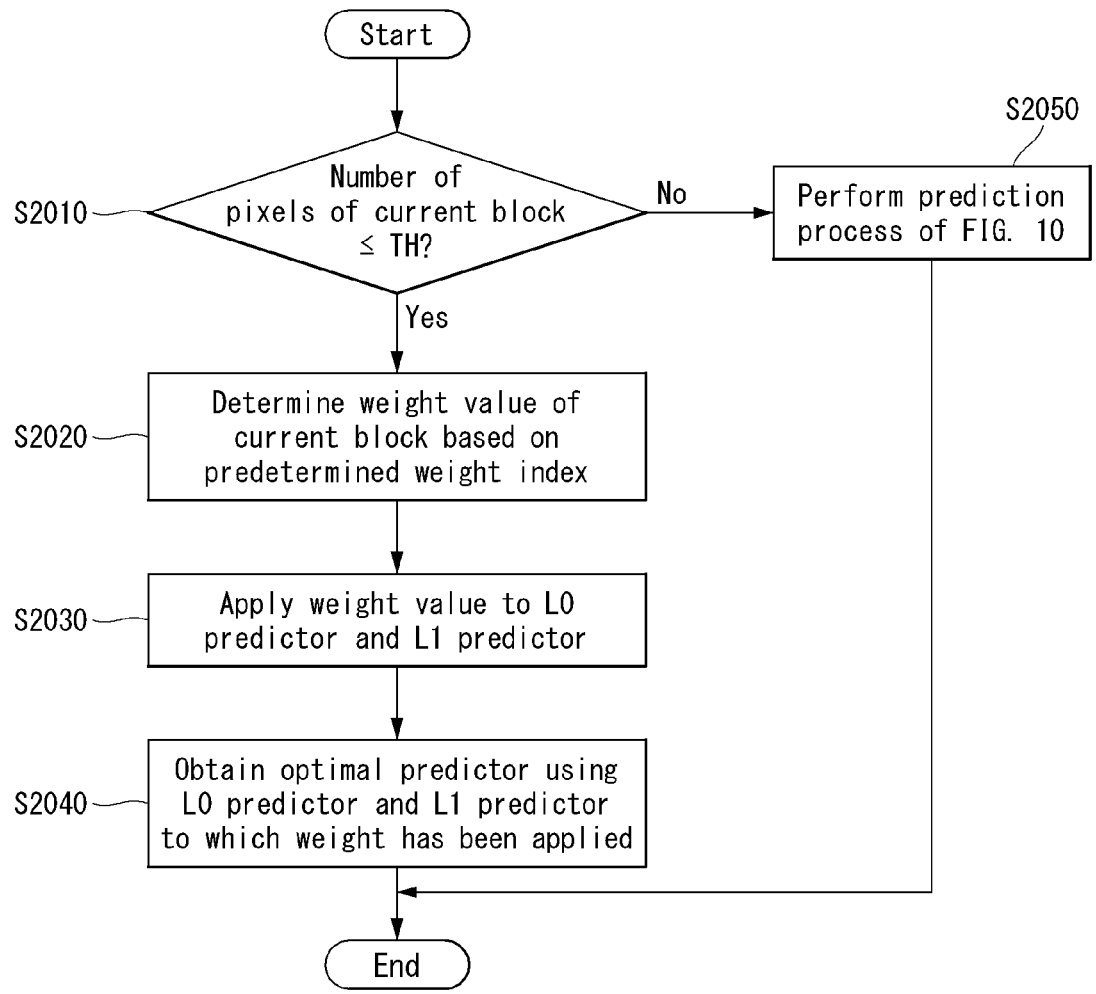
FIG. 20 is an embodiment to which the present invention is applied and is a flowchart for illustrating a process of performing a bi-directional prediction using a predetermined weight index based on the number of pixels within a block.

FIG. 20 is an embodiment to which the present invention is applied and is a flowchart for illustrating a process of performing a bi-directional prediction using a predetermined weight index based on the number of pixels within a block.

The present invention provides a method of performing a bi-directional prediction using a predetermined weight index based on the number of pixels within a block.

First, the encoder or the decoder may check whether the number of pixels of a current block is smaller than or equal to a threshold pixel number (S2010).

If, as a result of the check in step S2010, the number of pixels of the current block is smaller than or equal to the threshold pixel number, the encoder or the decoder may determine a weight value of the current block based on a predetermined weight index (S2020). For example, the encoder or the decoder may set a predetermined weight index as the weight index of the current block, and may obtain or derive a weight value corresponding to the weight index of the current block. Alternatively, the encoder or the decoder may set or derive a weight value, corresponding to the predetermined weight index, as a weight value of the current block.

The encoder or the decoder may apply the weight value of the current block to at least one of an L0 predictor or an L1 predictor (S2030), and may obtain an optimal predictor using at least one of the L0 predictor or the L1 predictor to which the weight has been applied (S2040).

Meanwhile, if, as a result of the check in step S2010, the number of pixels of the current block is greater than the threshold pixel number, the encoder or the decoder may obtain an optimal predictor through the prediction process of FIG. 10 (S2050).

FIG. 21 is an embodiment to which the present invention is applied and shows a syntax structure in which a bi-directional prediction is performed using a predetermined weight index based on the number of pixels within a block.

An embodiment of the present invention provides a method of performing a bi-directional prediction based on the number of pixels within a block, and provides a method of defining a weight index in the decoder.

First, the decoder may confirm which prediction method is used for a current prediction unit. For example, any one of an L0 bi-directional prediction, an L1 bi-directional prediction or a bi-directional prediction may be used as a prediction method.

Referring to FIG. 21, the decoder may confirm whether a bi-directional prediction is performed (S2110). For example, the decoder may confirm whether a bi-directional prediction is performed through if(inter_pred_idc[x0][y0]==PRED_BI). In this case, inter_pred_idc may mean whether an L0 bi-directional prediction, an L1 bi-directional prediction or a bi-directional prediction is used for the current prediction unit. PRED_BI may mean a bi-directional prediction.

If a bi-directional prediction is performed in step S2110, the decoder may check whether the number of pixels of a current block is smaller than or equal to a threshold pixel number (S2120). For example, the decoder may check whether the number of pixels of the current block is smaller than or equal to the threshold pixel number through if (cur_pix_num=<pix_num_threshold). In this case, cur_pix_num indicates the number of pixels of the current block. pix_num_threshold indicates the threshold pixel number.

If, as a result of the check in step S2120, the number of pixels of the current block is smaller than or equal to the threshold pixel number, the decoder may determine a weight value of the current block based on a predetermined weight index (S2130). For example, the decoder may set the predetermined weight index as the weight index of the current block.

For another example, the decoder may obtain or derive a weight value corresponding to the weight index of the current block. Alternatively, the decoder may set or derive a weight value, corresponding to the predetermined weight index, as a weight value of the current block.

Meanwhile, if, as a result of the check in step S2120, the number of pixels of the current block is greater than the threshold pixel number, the decoder may obtain (extract or parse) a weight index.

When the weight index is obtained, the decoder may derive a weight value corresponding to the weight index.

The decoder may obtain a bi-directional predictor by applying the weight value to the L0 predictor and the L1 predictor. In this case, the bi-directional predictor may correspond to an optimal predictor.

The decoder may reconstruct the current block using the bi-directional predictor.

FIG. 22 is an embodiment to which the present invention is applied and shows a syntax structure in which a bi-directional prediction is performed using a predetermined weight index based on at least one of a QT block size or BT division information.

The present invention provides a method of performing an optimal bi-directional prediction based on at least one of a QT block size or BT division information, and provides a method of defining a weight index in the decoder.

First, the decoder may confirm which prediction method is used for a current prediction unit. For example, any one of an L0 bi-directional prediction, an L1 bi-directional prediction or a bi-directional prediction may be used as a prediction method.

Referring to FIG. 22, the decoder may confirm whether a bi-directional prediction is performed (S2210). For example, the decoder may confirm whether a bi-directional prediction is performed through if(inter_pred_idc[x0][y0]==PRED_BI). In this case, inter_pred_idc may mean whether an L0 bi-directional prediction, an L1 bi-directional prediction or a bi-directional prediction is used for the current prediction unit. PRED_BI may mean a bi-directional prediction.

If a bi-directional prediction is performed in step S2210, the decoder may confirm at least one of whether the size of a current block is smaller than (or smaller than or equal to) a threshold QT block size or whether the current block is BT-split (S2220). In the present embodiment, a case whether the two conditions are satisfied is confirmed is described, but the present invention is not limited thereto. For example, whether the two conditions are satisfied may be confirmed through if(cur_blk_QT_size=<QT_threshold && BT_split_flag==true).

If the two conditions are satisfied, the decoder may set the weight index of the current block using a predetermined weight index (S2230). For example, BT blocks may obtain or derive a weight value using the predetermined weight index.

Meanwhile, if, as a result of the check in step S2220, the two conditions are not satisfied, the decoder may obtain (extract or parse) a weight index (S2240).

When the weight index is obtained, the decoder may derive a weight value corresponding to the weight index.

The decoder may obtain a bi-directional predictor by applying the weight value to an L0 predictor and an L1 predictor. In this case, the bi-directional predictor may correspond to an optimal predictor.

The decoder may reconstruct the current block using the bi-directional predictor.

As described above, the embodiments described in the present invention may be implemented and performed on a processor, a microprocessor, a controller or a chip. For example, the function units shown in FIGS. 1 and 2 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the processing method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing bi-directional prediction on a current block using a weight index by an apparatus, the method comprising:
   checking whether a pixel number of the current block is smaller than or equal to a threshold pixel number;
   based on that the pixel number of the current block is smaller than or equal to the threshold pixel number, checking whether a neighbor block having a weight index is present,
   wherein the threshold pixel number indicates a maximum pixel number within a block for deriving a weight index to be shared between blocks, and
   wherein the weight index to be shared between blocks is derived based on the weight index of the neighbor block;
   determining a weight index or weight value of the current block based on the weight index to be shared between blocks;
   obtaining a bi-directional predictor of the current block based on the weight index or weight value of the current block; and
   reconstructing the current block based on the bi-directional predictor.

2. The method of claim 1, wherein
   the weight index or weight value of the current block is obtained from a slice header if the neighbor block is not present.

3. The method of claim 1,
   wherein the threshold pixel number is a value obtained from a slice header or a predetermined value.

4. A method of performing bi-directional prediction on a current block using a weight index by an apparatus, the method comprising:
   checking whether a size of the current block is smaller than a threshold quadtree (QT) block size, wherein the threshold QT block size indicates a minimum size of a QT block for deriving a weight index to be shared between binarytree (BT) blocks;
   based on that the size of the current block is smaller than the threshold QT block size, checking whether the current block is BT-split;
   based on that the current block is BT-split, checking whether the current block is a first BT block, wherein if the current block is not the first BT block, the weight index to be shared is derived based on a weight index of the first BT block;
   determining a weight index or weight value of the BT block based on the weight index to be shared between BT blocks;
   obtaining a bi-directional predictor of the current block based on the weight index or the weight value of the BT block; and
   reconstructing the current block using the bi-directional predictor.

5. The method of claim 4,
   wherein if the current block is the first BT block, the weight index or weight value of the BT block is obtained from a prediction unit.

6. The method of claim 4,
   wherein the threshold QT block size is a value obtained from a slice header or a predetermined value.

7. An apparatus for performing bi-directional prediction on a current block using a weight index, the apparatus comprising:
   a processor configured to check whether a pixel number of the current block is smaller than or equal to a threshold pixel number,
   based on that the pixel number of the current block is smaller than or equal to the threshold pixel number, check whether a neighbor block having a weight index is present,
   wherein the threshold pixel number indicates a maximum pixel number within a block for deriving a weight index to be shared between blocks, and
   wherein the weight index to be shared between blocks is derived based on the weight index of the neighbor block;
   determine a weight index or weight value of the current block based on the weight index to be shared between blocks;
   obtain a bi-directional predictor of the current block based on the weight index or weight value of the current block; and
   reconstruct the current block using the bi-directional predictor.

8. The apparatus of claim 7,
   wherein the apparatus obtains the weight index of the current block from a slice header if the neighbor block is not present.

9. An apparatus for performing bi-directional prediction on a current block using a weight index, the apparatus comprising:
   a processor configured to check whether a size of the current block is smaller than a threshold quadtree (QT) block size, wherein the threshold QT block size indicates a minimum size of a QT block for deriving a weight index to be shared between binarytree (BT) blocks;
   based on that the size of the current block is smaller than the threshold QT block size, check whether the current block is BT-split;
   based on that the current block is BT-split, check whether the current block is a first BT block, wherein if the current block is not the first BT block, the weight index is derived from the first BT block;

determine a weight index or weight value of the BT block based on the weight index to be shared between BT blocks;

obtain a bi-directional predictor of the current block based on the weight index or the weight value of the BT block; and reconstruct the current block using the bi-directional predictor.

10. The apparatus of claim 9, wherein if the current block is the first BT block, the weight index or weight value of the BT block is obtained from a prediction unit.

* * * * *